(12) United States Patent
Tsutsui et al.

(10) Patent No.: US 11,154,975 B2
(45) Date of Patent: Oct. 26, 2021

(54) TOOL

(71) Applicant: MAX CO., LTD., Tokyo (JP)

(72) Inventors: Tomohide Tsutsui, Tokyo (JP); Tomohiko Serita, Tokyo (JP)

(73) Assignee: MAX CO., LTD., Tokyo (JP)

( * ) Notice: Subject to any disclaimer, the term of this patent is extended or adjusted under 35 U.S.C. 154(b) by 252 days.

(21) Appl. No.: 15/354,516

(22) Filed: Nov. 17, 2016

(65) Prior Publication Data

US 2017/0144290 A1 May 25, 2017

(30) Foreign Application Priority Data

Nov. 20, 2015 (JP) .............................. JP2015-228222
Oct. 14, 2016 (JP) .............................. JP2016-202657

(51) Int. Cl.
*B25F 5/00* (2006.01)
*G01L 1/22* (2006.01)

(52) U.S. Cl.
CPC ............... *B25F 5/001* (2013.01); *G01L 1/22* (2013.01)

(58) Field of Classification Search
CPC .................................. B25F 5/001; G01L 1/22
USPC ...................... 173/170; 200/332, 2, 505, 522
See application file for complete search history.

(56) References Cited

U.S. PATENT DOCUMENTS

| 3,951,250 A | * | 4/1976 | Pointon | ................ | H03K 17/975 |
| | | | | | 200/600 |
| 4,273,682 A | * | 6/1981 | Kanamori | ................ | C08K 9/00 |
| | | | | | 252/511 |
| 4,472,758 A | * | 9/1984 | Goto | ..................... | H01H 13/702 |
| | | | | | 200/600 |
| 4,794,366 A | * | 12/1988 | Sakamoto | ................. | G01L 1/20 |
| | | | | | 29/620 |
| 4,929,804 A | * | 5/1990 | Kawai | .................. | H01H 13/702 |
| | | | | | 200/339 |
| 5,365,155 A | * | 11/1994 | Zimmermann | .......... | H01H 9/06 |
| | | | | | 318/268 |
| 5,999,084 A | * | 12/1999 | Armstrong | ........... | H01C 10/106 |
| | | | | | 200/516 |

(Continued)

FOREIGN PATENT DOCUMENTS

| CN | 201735891 U | 2/2011 |
| CN | 201878124 U | 6/2011 |

(Continued)

OTHER PUBLICATIONS

Extended European Search Report dated Aug. 27, 2018 in corresponding European Patent Application No. 18172875.9 (8 pages).

(Continued)

*Primary Examiner* — Thanh K Truong
*Assistant Examiner* — David G Shutty
(74) *Attorney, Agent, or Firm* — Rothwell, Figg, Ernst & Manbeck, P.C.

(57) ABSTRACT

A tool includes a switch and a handle. The switch is configured to cause an electric component to operate. The handle is held by a hand to manipulate the switch. The switch includes a switch manipulation part to be manipulated, and a load sensor. The load sensor is configured to receive a pressing force through the switch manipulation part. The load sensor includes a pressure-sensitive conductive elastic member in which conductive particles are dispersed in a non-conductive elastic material.

17 Claims, 13 Drawing Sheets

(56) References Cited

U.S. PATENT DOCUMENTS

| | | | | | |
|---|---|---|---|---|---|
| 6,275,138 | B1* | 8/2001 | Maeda | | H01C 10/106 338/128 |
| 6,661,332 | B1* | 12/2003 | Hsu | | H01H 13/70 338/21 |
| 7,086,483 | B2* | 8/2006 | Arimura | | B25B 21/00 173/180 |
| 7,186,940 | B1* | 3/2007 | Wong | | H01H 1/18 200/522 |
| 8,324,845 | B2* | 12/2012 | Suzuki | | H02H 7/0838 318/139 |
| 9,914,204 | B2* | 3/2018 | Hosking | | B25F 5/00 |
| 2007/0056385 | A1* | 3/2007 | Lorenz | | H01H 13/702 73/818 |
| 2010/0018847 | A1* | 1/2010 | Arataki | | H01H 3/20 200/341 |
| 2010/0084150 | A1 | 4/2010 | Suzuki et al. | | |
| 2010/0148999 | A1* | 6/2010 | Casparian | | H03K 17/975 341/34 |
| 2010/0206703 | A1* | 8/2010 | Puzio | | B25F 5/02 200/61.85 |
| 2011/0168420 | A1* | 7/2011 | Kobayashi | | H01H 9/047 173/170 |
| 2012/0068633 | A1* | 3/2012 | Watanabe | | H02K 7/14 318/3 |
| 2013/0245704 | A1* | 9/2013 | Koltz | | A61B 17/7074 606/86 A |
| 2013/0249463 | A1* | 9/2013 | Nishikimi | | B25F 5/00 318/504 |
| 2013/0255981 | A1* | 10/2013 | Noto | | B25F 5/00 173/20 |
| 2014/0014384 | A1* | 1/2014 | Horie | | H01M 2/105 173/217 |
| 2014/0069672 | A1* | 3/2014 | Mashiko | | B25B 21/00 173/47 |
| 2014/0125256 | A1 | 5/2014 | Watanabe et al. | | |
| 2014/0252881 | A1* | 9/2014 | Dinh | | H03K 17/955 307/125 |
| 2015/0022125 | A1* | 1/2015 | Takano | | H02P 27/08 318/139 |
| 2015/0113815 | A1* | 4/2015 | McRoberts | | B23D 51/01 30/392 |
| 2015/0174750 | A1* | 6/2015 | Hosking | | B25F 5/00 173/170 |
| 2016/0172129 | A1* | 6/2016 | Zercoe | | H01H 13/86 200/5 A |

FOREIGN PATENT DOCUMENTS

| | | | | |
|---|---|---|---|---|
| CN | 102528769 A | 7/2012 | | |
| CN | 103358289 A | 10/2013 | | |
| EP | 2 093 550 A2 | 8/2009 | | |
| EP | 2711138 A2 | 3/2014 | | |
| JP | 7-220563 A | 8/1995 | | |
| JP | 3050919 U | 5/1998 | | |
| JP | 2001-93707 A | 4/2001 | | |
| JP | 2002-310824 A | 10/2002 | | |
| JP | 2009190099 A * | 8/2009 | ............... | B25F 5/00 |
| JP | A-2009-190099 | 8/2009 | | |
| JP | 2012061576 A * | 3/2012 | ............... | B25F 5/02 |
| JP | 2012-101326 A | 5/2012 | | |
| JP | 2014-54703 A | 3/2014 | | |
| JP | 2014-167926 A | 9/2014 | | |
| JP | 2015-188997 A | 11/2015 | | |
| WO | WO-A1-2012-043288 | 4/2012 | | |
| WO | WO A2-2012-160799 | 11/2012 | | |
| WO | WO 2014/013474 A1 * | 1/2014 | ............... | B25F 5/00 |
| WO | WO-2014013474 A1 * | 1/2014 | ............... | B25F 5/00 |

OTHER PUBLICATIONS

Extended European Search Report dated Jul. 26, 2017 in corresponding European patent application 16002440.2 (9 pages).

* cited by examiner

TOOL

CROSS-REFERENCE TO RELATED APPLICATION

This application is based on and claims priority under 35 USC119 from Japanese Patent Application Nos. P2015-228222 filed on Nov. 20, 2015 and P2016-202657 filed on Oct. 14, 2016.

TECHNICAL FIELD

The present invention relates to a tool having a switch for operating an electric component.

BACKGROUND

As known to those skilled in the art, an electric tool having a switch for operating an electric component such as a motor is equipped with a sliding type variable resistor so as to control a rotating speed of the motor. The switch having the sliding type variable resistor requires many strokes of a switch manipulation part referred to as a trigger, and a size of the switch is being increased.

Therefore, a related art has been proposed in which a semiconductor, a strain gauge or the like are employed, and a load sensor converting a load into a voltage is applied to a switch of an electric tool (for example, refer to JP-A-2014-167926).

For the electric tool, another related art has been proposed in which an automatic power-off function is provided to automatically stop supplying power from a battery when the tool is not in use for a lengthy period of time, so as to suppress power consumption of the battery. The electric tool having the automatic power-off function is provided with a switch, which is also called a wakeup switch, because a function of resuming the supply of power is required when the tool is intended to be used again. The power to a control unit including a motor or the like is cut off except when the tool is used, and the supply of the power is resumed when the tool is used (for example, refer to JP-A-2012-101326).

SUMMARY

By using a load sensor, a stroke of a switch manipulation part that is also referred to as a trigger may be reduced. However, the conventional load sensor is problematic in that it does not operate a control circuit to begin supplying power and requires a wakeup switch to activate the sensor from a state where the power is cut off.

In the electric tool having a sleep mode, it is necessary to manipulate the wakeup switch when the tool is activated. However, since it is complicated to manipulate the switch manipulation part after the wakeup switch has been manipulated, a two-stage switch is employed, which is configured to output a control signal of an electric component after the wakeup switch has been operated by manipulating the trigger manipulation part.

By using the general load sensor, the stroke of the switch manipulation part may be reduced. However, since the wakeup switch is configured to be a mechanical switch that renders contact points to come into contact with each other by displacement, such as sliding, rotation, or the like, a relatively large stroke is required. Thus, in a configuration for operating the wakeup switch and the load sensor by manipulating the trigger manipulation part, the stroke of the switch manipulation part is set by the wakeup switch, so that there is a limitation on reducing the stroke of the switch manipulation part. Since it is necessary to form two sets of switches, a size of the tool is inevitably increased, so that there is a restriction on arranging components, or a switch structure becomes complicated, and it is difficult to ensure water-proofness and dust-proofness.

The invention has been made in view of the above problems occurring in the related art, and an object of the invention is to provide a tool that uses a load sensor and may activate a control unit and control an electric component with one set of switches.

According to one aspect of the invention, a tool includes a switch and a handle. The switch is configured to cause an electric component to operate. The handle is held by a hand to manipulate the switch. The switch includes a switch manipulation part to be manipulated, and a load sensor. The load sensor is configured to receive a pressing force through the switch manipulation part. The load sensor includes a pressure-sensitive conductive elastic member in which conductive particles are dispersed in a non-conductive elastic material.

In the invention, the tool further includes a control unit and a control circuit. The control unit is configured to control the electric component. The control circuit is configured to supply power to the control unit. The load sensor is configured to cause the control circuit to operate, when a load is applied to the load sensor by the manipulation of the switch manipulation part. The control unit is configured to control the electric component according to change of the load applied to the load sensor.

According to one aspect of the invention, a tool includes a switch and a handle. The switch is configured to cause an electric component to operate. The handle is held by a hand to manipulate the switch. The switch includes a switch manipulation part to be manipulated, and a load sensor. The load sensor is configured to receive a pressing force through the switch manipulation part. The tool further includes a control unit and a control circuit. The control unit is configured to control the electric component according to change of a load applied to the load sensor by manipulating the switch manipulation part. The control circuit is configured to supply power to the control unit, when the load is applied to the load sensor by manipulating the switch manipulation part.

According to the invention, when a switch manipulation part is manipulated to apply load to a load sensor, it is possible to operate a control circuit that supplies power by a control unit that controls an electric component, and to activate the control unit from a state where the supply of power is stopped. Further, it is possible to control the electric component by changing (increasing or reducing) load applied to the load sensor.

Therefore, it is possible to activate the control unit and to control the electric component, by one set of switches using the load sensor.

DETAILED DESCRIPTION

Hereinafter, an electric tool as an example of an embodiment of a tool of the invention will be described with reference to the accompanying drawings.

<Configuration Example of Electric Tool of First Embodiment>

Figure 1:
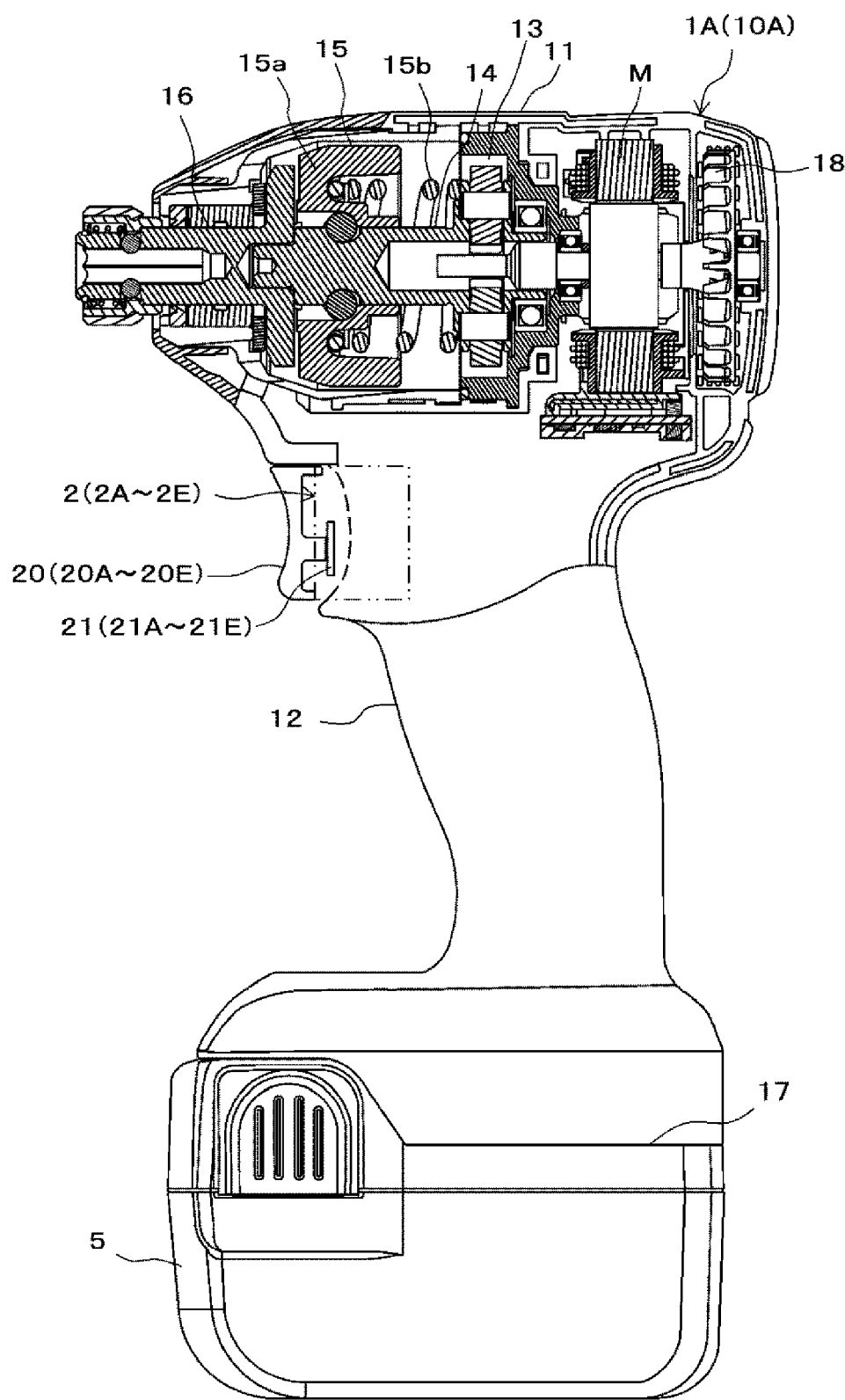
FIG. 1 is a view illustrating an overall configuration of an example of an electric tool according to a first embodiment.
Figure 2:
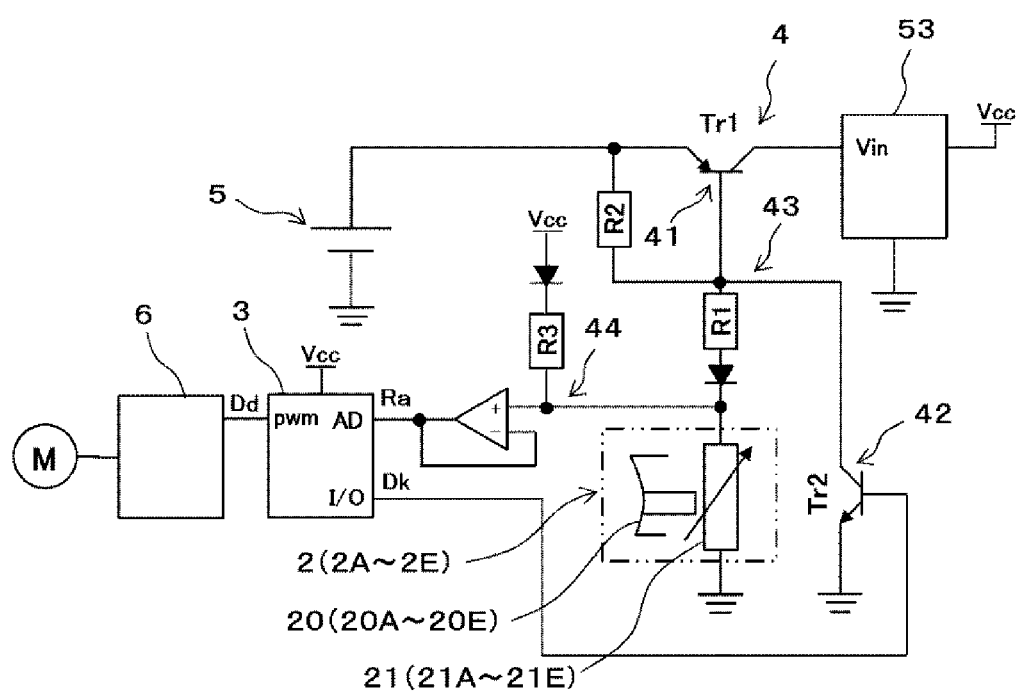
FIG. 2 is a block diagram illustrating an example of a circuit configuration of the electric tool according to the present embodiment.

FIG. 1 is a view illustrating an overall configuration of an example of an electric tool according to a first embodiment, and FIG. 2 is a block diagram illustrating an example of a circuit configuration of the electric tool according to the present embodiment.

An electric tool 1A of the first embodiment includes a switch 2 that operates a motor M as an electric component, a control unit 3 that controls the motor M by the manipulation of the switch 2, a control circuit 4 that activates the control unit 3 by the manipulation of the switch 2, and a power supply unit 5 that supplies power to the motor M, the control unit 3 and the like.

The electric tool 1A of the present embodiment is for example an impact driver 10A, and includes an electric-tool body 11 and a grip 12 as a handle equipped with the switch 2, as illustrated in FIG. 1. The impact driver 10A of the first embodiment as the electric tool 1A includes a spindle 14 to which the driving force of the motor M is transmitted through a reducer 13, an anvil 16 to which the rotation of the spindle 14 is transmitted through a hitting mechanism 15, and a fan 18 that cools the motor M or the like.

The motor M is an example of an electric machine, and is made up of a DC brushless motor in the present example. According to the present example, the reducer 13 includes a planet gear. Here, an input shaft and an output shaft of the reducer 13 are arranged on the same axis. Thus, the motor M and the spindle 14 are arranged on the same axis.

The hitting mechanism 15 includes a hammer 15a that gives a hitting force in a rotating direction to the anvil 16, and a compression spring 15b that biases the hammer 15a in a direction where it approaches the anvil 16. The hammer 15a is rotatably disposed on the same axis as the rotating shaft of the motor M.

The hitting mechanism 15 is operated as follows: when a load exceeding a predetermined level acts on the anvil 16, the hammer 15a is retreated while compressing the compression spring 15b, so that the anvil 16 temporarily disengages from the hammer 15a in the rotating direction, and thereafter the hammer 15a is advanced by the restoring force of the compression spring 15b, and simultaneously the hammer 15a hits the anvil 16 in the rotating direction.

The anvil 16 is rotatably supported on the same axis as the rotating shaft of the motor M, receives the driving force of the motor M through the spindle 14 and the hitting mechanism 15 to be rotated, and simultaneously is hit in the rotating direction by the hitting mechanism 15.

A bit, a socket or the like (not illustrated) is detachably attached to the anvil 16, so that a screw may be fastened to a fastened object while hitting in the rotating direction.

The impact driver 10A mounts the above-described motor M, reducer 13, spindle 14, hitting mechanism 15 and anvil 16 in the electric-tool body 11. The impact driver 10A is configured such that the electric-tool body 11 is formed on one side of the grip 12 and the power supply unit 5 is attached to the other side.

Since the power supply unit 5 referred to as a battery pack is detachably mounted on the impact driver 10A, a battery-pack attaching part 17 is provided on one end of the grip 12. The power supply unit 5 may be a rechargeable battery, for example, a lithium ion battery, a lithium ferrite battery, a lithium polymer battery, a nickel hydrogen battery, a nickel cadmium battery or the like.

<Configuration Example of Switch According to First Embodiment>

Figure 3:
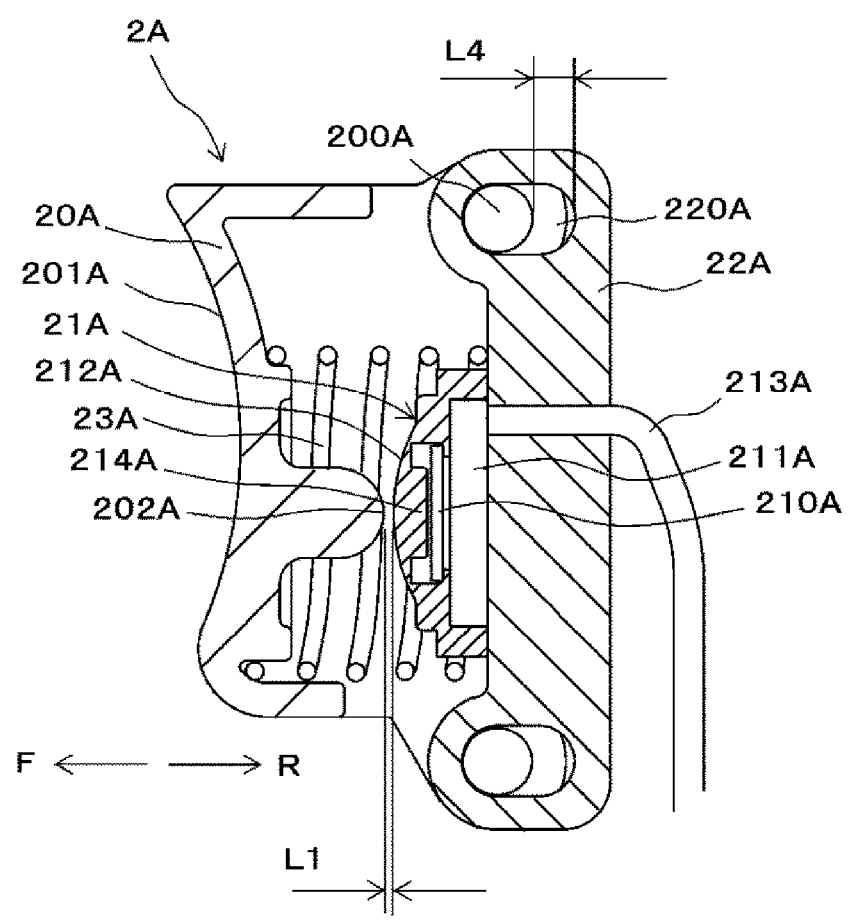
FIG. 3 is a view illustrating a configuration of an example of a switch according to the first embodiment.

FIG. 3 is a view illustrating the configuration of an example of a switch according to the first embodiment, and the switch 2A of the first embodiment will be described below in detail with reference to the respective drawings. In the impact driver 10A, the switch 2A is formed on the grip 12 in the vicinity of the electric-tool body 11. The switch 2A is provided with a trigger 20A that is manipulated by a worker, and a load sensor 21A that receives a pressing force through the trigger 20A.

The trigger 20A is an example of the switch manipulation part, and is attached to a support part 22A attached to the grip 12 illustrated in FIG. 1 to be movable in directions indicated by arrows F and R. In the present example, a pin 200A formed on the trigger 20A is fitted into an elongated hole 220A formed in a support part 22A, so that the trigger 20A is movably attached to the support part 22A while a moving amount and a moving direction are regulated.

The trigger 20A has a manipulation receiving part 201A formed on an outer surface that is one side thereof to be curved in a concave shape, for example, thus making it easy to exert a force in a direction pulling the trigger by a finger. The trigger 20A has a pressing convex part 202A formed on an inner surface that is the other side thereof to protrude in a direction of the load sensor 21A.

The switch 2A includes a coil spring 23A between the trigger 20A and a support part 22A. The trigger 20A is biased in a direction where it moves away from the load sensor 21A, that is, a direction of arrow F, by the coil spring 23A.

The switch 2A is operates as follows: when a forefinger that is a predetermined finger of a hand holding the grip 12 illustrated in FIG. 1 applies a force in a direction pulling the trigger 20A, the coil spring 23A is compressed and the trigger 20A is moved in the direction indicated by the arrow R. When a force pulling the trigger 20A becomes weak, the trigger 20A is moved in the direction indicated by the arrow F by the restoring force of the coil spring 23A.

Figure 4:
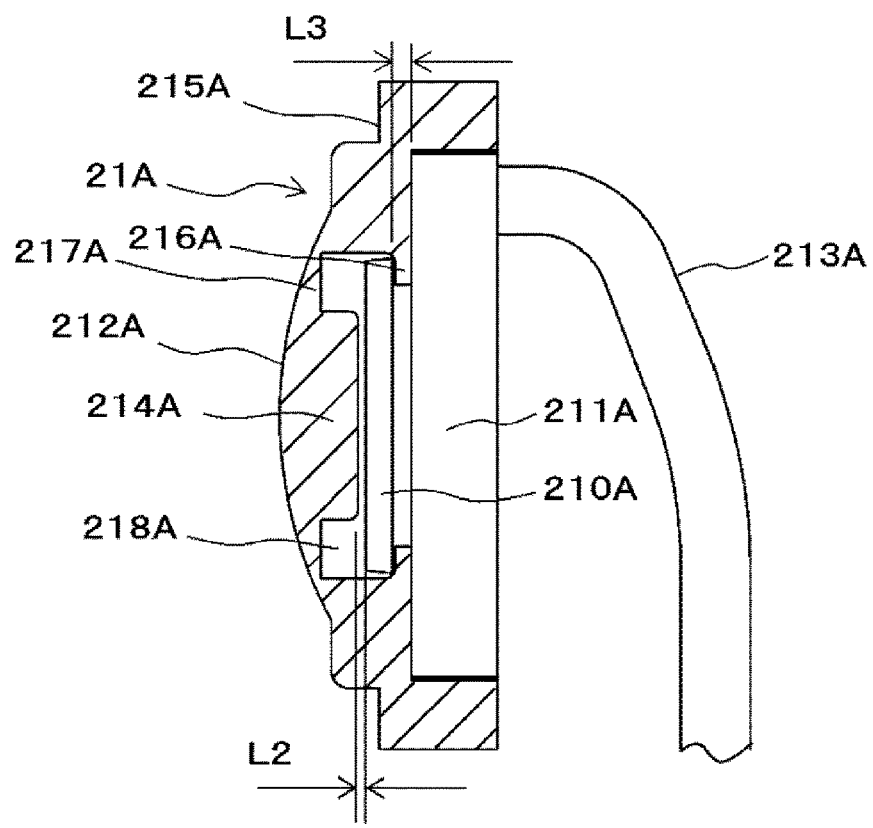
FIG. 4 is a view illustrating a configuration of an example of a load sensor according to the first embodiment.
Figure 5:
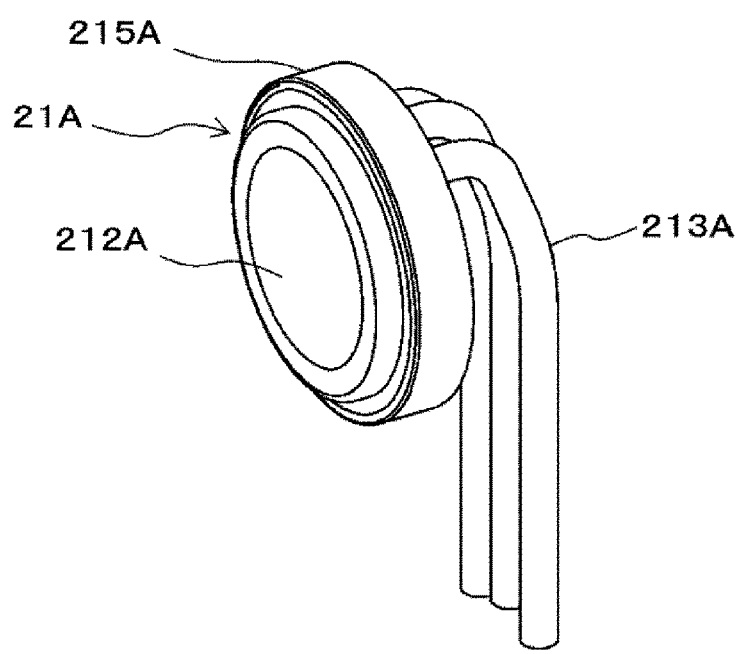
FIG. 5 is a view illustrating a configuration of an example of the load sensor according to the first embodiment.

FIGS. 4 and 5 are views illustrating the configuration of an example of a load sensor according to the first embodiment. The load sensor 21A includes a pressure-sensitive conductive elastic member 210A that is changed in electric conductivity depending on a load, and a substrate 211A that forms variable resistance having a resistance value that varies depending on a change in electric conductivity of the pressure-sensitive conductive elastic member 210A. A sealing cover 212A covering the pressure-sensitive conductive elastic member 210A and the substrate 211A is attached to the load sensor 21A.

The pressure-sensitive conductive elastic member 210A is made by dispersing conductive particles such as carbon in a non-conductive elastic material such as rubber. The pressure-sensitive conductive elastic member 210A has a plate shape, is elastically deformable in a direction in which it is bent when receiving a load, and in addition, is elastically deformable in a direction in which it is compressed.

The substrate 211A has a pair of conductive patterns that are formed on an outer surface that is one surface facing the pressure-sensitive conductive elastic member 210A to be insulated from each other. Wiring 213A is connected to each conductive pattern.

The sealing cover 212A includes a pressing part 214A (or load sensor pressing part 214A) that presses the pressure-sensitive conductive elastic member 210A, a seal part 215A that seals a periphery of the substrate 211A, and a support part 216A that supports the pressure-sensitive conductive elastic member 210A against the substrate 211A. In the sealing cover 212A, the pressing part 214A, the seal part 215A and the support part 216A are integrally formed of the elastic material such as rubber.

In the sealing cover 212A, an internal space 218A is formed to face the pressure-sensitive conductive elastic member 210A. A portion of the pressing part 214A facing the pressure-sensitive conductive elastic member 210A in the internal space 218A includes a convex portion that protrudes in a direction of the pressure-sensitive conductive elastic member 210A. The sealing cover 212A is formed integrally with the seal part 215A, with a flexible part 217A being provided around the pressing part 214A. The flexible part 217A is formed to be thinner than the pressing part 214A and the seal part 215A, and does not inhibit the pressing part 214A from being elastically deformed in a direction in which it is separated from the pressure-sensitive conductive elastic member 210A.

The seal part 215A is shaped to seal a side of the substrate 211A and a surface in the vicinity of the side. The support part 216A protrudes from an inner peripheral portion of the seal part 215A between the pressure-sensitive conductive elastic member 210A and the substrate 211A, and supports a peripheral portion of the pressure-sensitive conductive elastic member 210A against the substrate 211A.

In the switch 2A, the load sensor 21A is attached to the support part 22A in a direction where the sealing cover 212A faces the trigger 20A. The load sensor 21A is attached to the support part 22A, for example, through an attaching member (not illustrated) that is formed as an integral or independent component. Alternatively, the load sensor 21A may be attached to the support part 22A by an adhesive.

In the switch 2A, a first malfunction suppressing space L1 is formed between the pressing convex part 202A of the trigger 20A and the sealing cover 212A of the load sensor 21A. In the switch 2A, a second malfunction suppressing space L2 is formed between the pressing part 214A of the sealing cover 212A and the pressure-sensitive conductive elastic member 210A. In the load sensor 21A, an insulating space L3 is formed between the pressure-sensitive conductive elastic member 210A and the substrate 211A.

In the switch 2A, in the state where the insulating space L3 is formed between the pressure-sensitive conductive elastic member 210A and the substrate 211A, a resistance value of the load sensor 21A is infinite, and the load sensor 21A is in a non-conduction state.

In the switch 2A, when the trigger 20A is pulled, the trigger 20A is moved in the direction of arrow R, so that the first malfunction suppressing space L1 is reduced and the pressing convex part 202A comes into contact with the sealing cover 212A at the load sensor pressing part location 214A. When the trigger 20A is further pulled, the pressing convex part 202A of the trigger 20A presses the sealing cover 212A, so that the second malfunction suppressing space L2 is reduced and the pressing part 214A of the sealing cover 212A comes into contact with the pressure-sensitive conductive elastic member 210A.

When the trigger 20A is further pulled, the pressure-sensitive conductive elastic member 210A is pressed through the trigger 20A and the sealing cover 212A, so that the pressure-sensitive conductive elastic member 210A is elastically deformed in a direction where it is bent, the insulating space L3 is reduced, and the pressure-sensitive conductive elastic member 210A comes into contact with the substrate 211A.

When the trigger 20A is further pulled, the pressure-sensitive conductive elastic member 210A is pressed through the trigger 20A and the sealing cover 212A, so that the pressure-sensitive conductive elastic member 210A is elastically deformed in a direction where it is compressed, in the state where the pressure-sensitive conductive elastic member 210A is in contact with the substrate 211A.

The load sensor 21A has characteristics in which the resistance value varies according to a deformation amount, when the pressure-sensitive conductive elastic member 210A is pressed and deformed. When the deformation amount of the pressure-sensitive conductive elastic member 210A is increased by an increase in load and the resistance value is reduced to a predetermined value, the load sensor 21A assumes a conduction state. When the load is further increased when the load sensor 21A is in the conduction state, the deformation amount of the pressure-sensitive conductive elastic member 210A is increased and the resistance value is further reduced.

As described above, since the pressure-sensitive conductive elastic member 210A is pressed through the trigger 20A, the sum of the first malfunction suppressing space L1, the second malfunction suppressing space L2 and the insulating space L3 is less than the moving amount L4 of the trigger 20A.

When it is possible to secure the insulating space L3 in an initial state where the trigger 20A is not pressed, the first malfunction suppressing space L1 and the second malfunction suppressing space L2 may not be formed. However, in consideration of a possibility that a load is applied to the pressure-sensitive conductive elastic member 210A by the dimensional tolerance of each component and the accumulation of tolerance when respective components are assembled with each other, in the initial state where the trigger 20A is not pressed, the first malfunction suppressing space L1 and the second malfunction suppressing space L2 are formed.

The insulating space L3 may be sensuously considered to be "0", in the manipulation of pulling the trigger 20A with a person's finger. Thus, the moving amount L4 (or total stroke movement amount) of the trigger 20A is set to be 0 mm or more and 3 mm or less. When the moving amount L4 of the trigger 20A is set to be 3 mm or less, a person rarely feels a manipulation amount when pulling the trigger 20A by his or her finger. Hence, it becomes easy, to control the number of rotations of the motor M according to the intensity of a force pulling the trigger 20A.

In the switch 2A using the load sensor 21A equipped with the pressure-sensitive conductive elastic member 210A, it is unnecessary to have a mechanical variable resistor, such as a sliding resistor or a rotary resistor. Conventionally, the stroke of the trigger is determined by a movable range of the variable resistor. In contrast, in the switch 2A, a degree of freedom upon determining the stroke of the trigger 20A is improved.

The switch 2A is configured such that the trigger 20A is movable. However, this employs the load sensor 21A having the pressure-sensitive conductive elastic member 210A. Thus, when comparing this configuration with the configuration having the mechanical variable resistor, the former may reduce the number of moving components, and may achieve a reduction in size of the switch 2A. The reduction in size of the switch 2A may improve a degree of freedom upon placing the trigger 20A. For example, in addition to a normal position where the switch may be manipulated by the forefinger of the hand holding the grip 12, the switch 2A may be additionally provided on a lower portion of the grip 20, thus allowing another trigger 20A to be manipulated even on the lower portion of the grip 20. Alternatively, the switch 2A may be additionally provided on the electric-tool body 11, thus allowing another trigger 20A to be manipulated even on the electric-tool body 11. Therefore, it is possible to change a method of holding the tool according to the kind of work and to lessen a workload.

<Configuration Example of Switch According to Second Embodiment>

Figure 6:
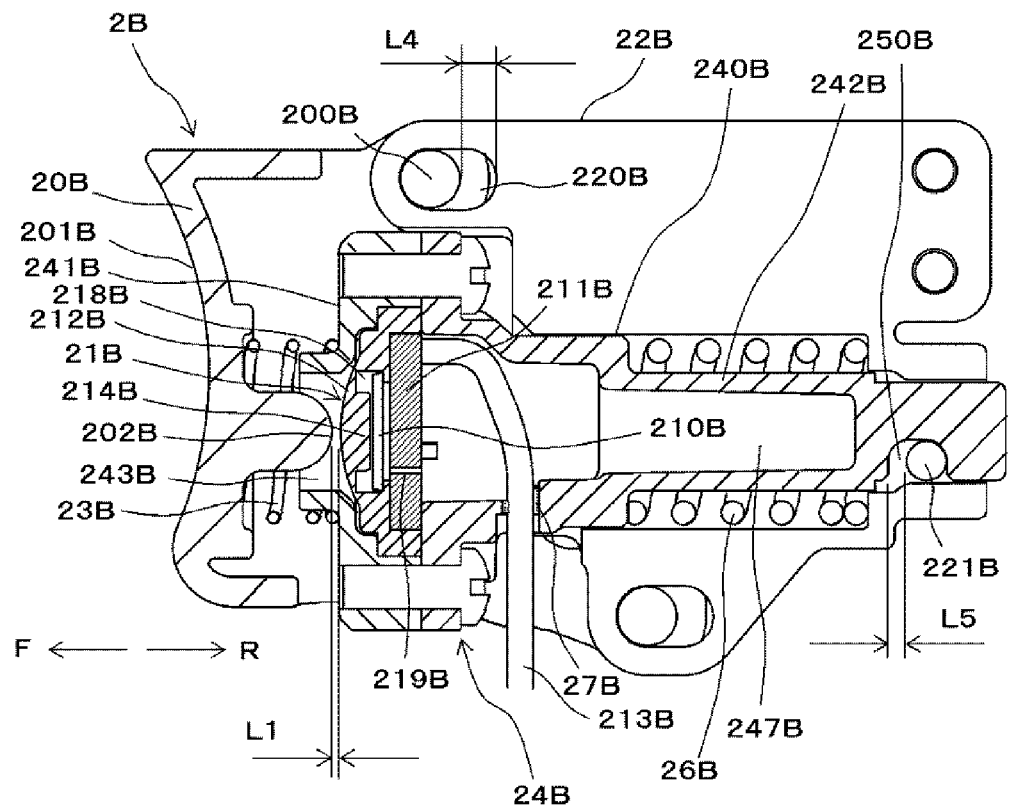
FIG. 6 is a view illustrating a configuration of an example of a switch according to a second embodiment.
Figure 7:
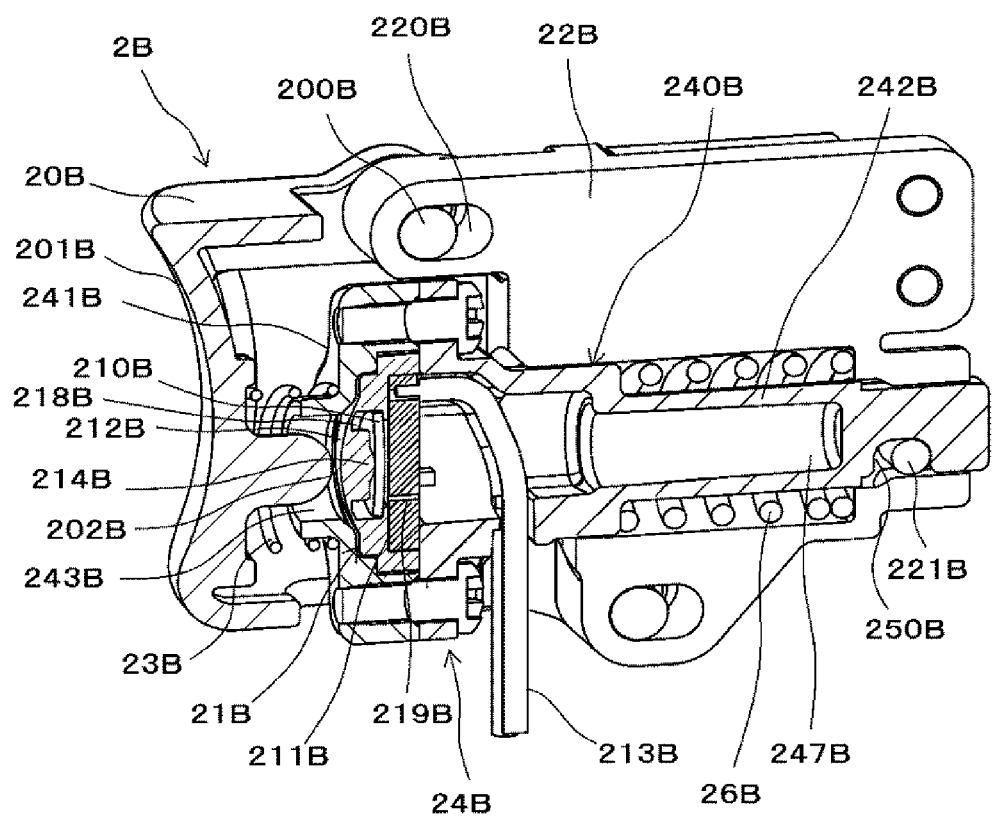
FIG. 7 is a view illustrating a configuration of an example of the switch according to the second embodiment.
Figure 8:
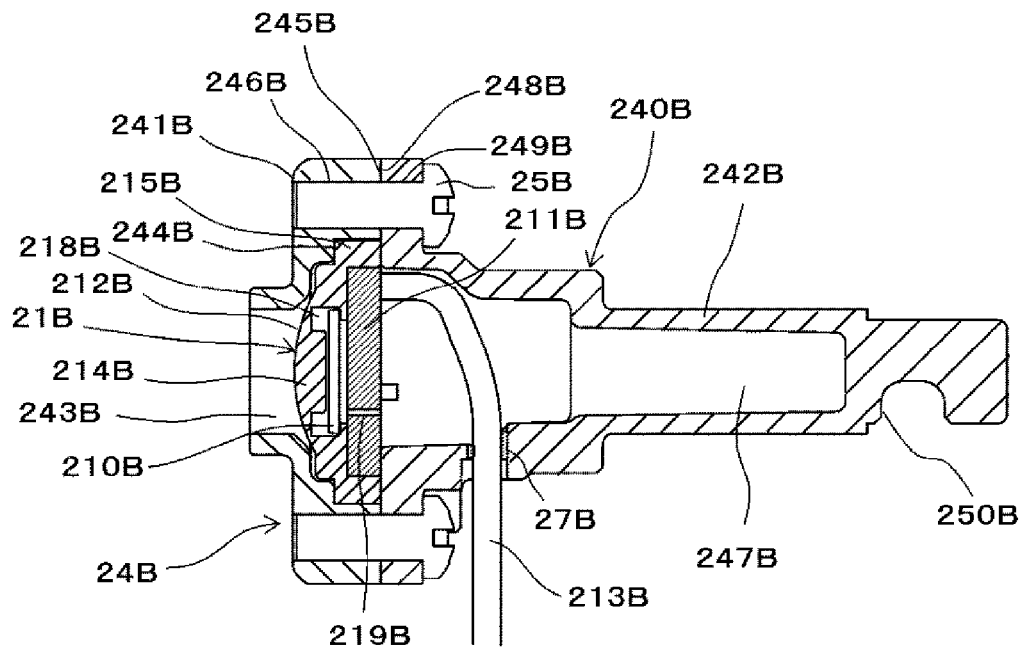
FIG. 8 is a view illustrating a configuration of an example of a sensor unit according to the present embodiment.
Figure 9:
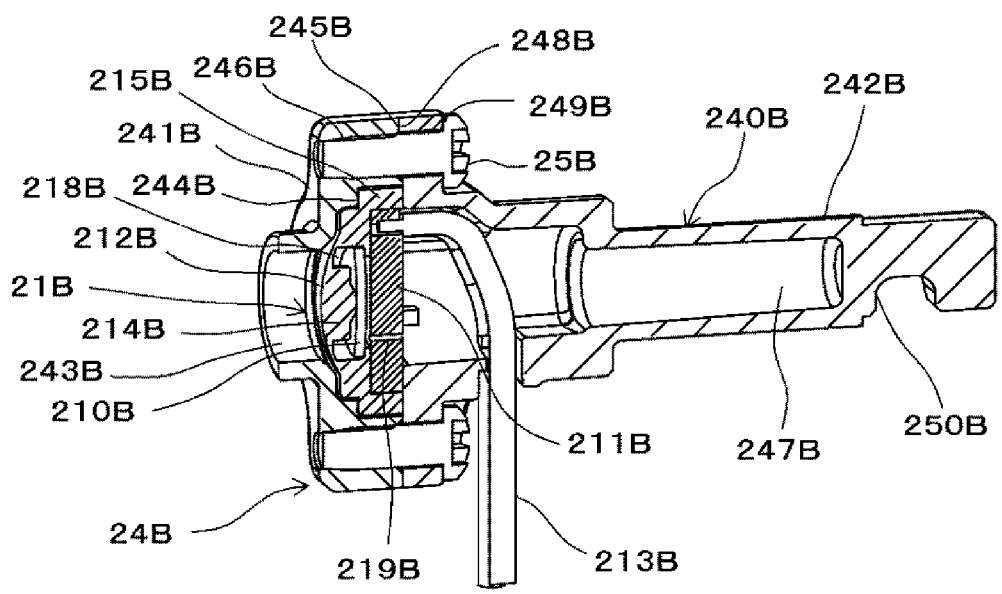
FIG. 9 is a view illustrating a configuration of an example of the sensor unit according to the present embodiment.

FIGS. 6 and 7 are views illustrating the configuration of an example of a switch according to the second embodiment, and FIGS. 8 and 9 are views illustrating the configuration of an example of a sensor unit according to the present embodiment. Hereinafter, the switch 2B of the second embodiment will be described in detail with reference to the respective drawings.

In the impact driver 10A, the switch 2B is formed on the grip 12 in the vicinity of the electric-tool body 11. The switch 2B includes a trigger 20B that is manipulated by a worker, and a sensor unit 24B having a load sensor 21B that receives a pressing force through the trigger 20B.

The trigger 20B is an example of the switch manipulation part, and is attached to a support part 22B attached to the grip 12 illustrated in FIG. 1 to be movable in directions indicated by arrows F and R. In the present example, a pin 200B formed on the trigger 20B is fitted into an elongated hole 220B formed in a support part 22B, so that the trigger 20B is movably attached to the support part 22B while a moving amount and a moving direction are regulated.

The trigger 20B has a manipulation receiving part 201B formed on an outer surface that is one side thereof to be curved in a concave shape, for example, thus making it easy to exert a force in a direction pulling the trigger by a finger. The trigger 20B has a pressing convex part 202B formed on an inner surface that is the other side thereof to protrude in a direction of the load sensor 21B.

The switch 2B includes a coil spring 23B between the trigger 20B and the sensor unit 24B. The trigger 20B is biased in a direction where it moves away from the load sensor 21B, that is, a direction of arrow F, by the coil spring 23B.

The switch 2B is operates as follows: when a forefinger that is a predetermined finger of a hand holding the grip 12 illustrated in FIG. 1 applies a force in a direction pulling the trigger 20B, the coil spring 23B is compressed and thereby the trigger 20B is moved in the direction indicated by the arrow R. When a force pulling the trigger 20B becomes weak, the trigger 20B is moved in the direction indicated by the arrow F by the restoring force of the coil spring 23B.

Figure 10:
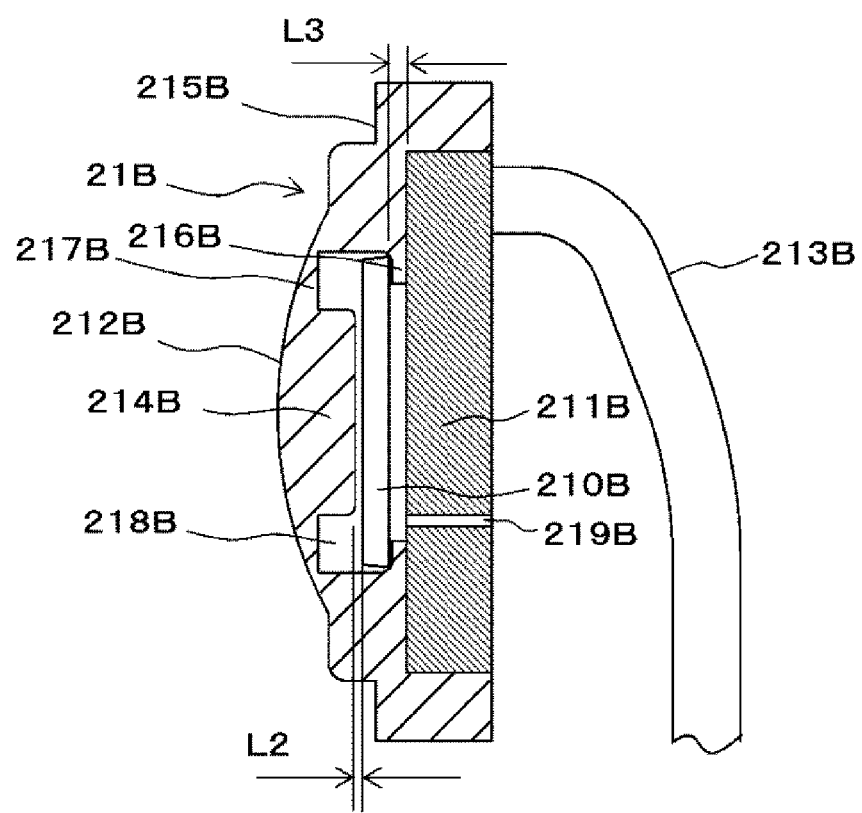
FIG. 10 is a view illustrating a configuration of an example of a load sensor according to the second embodiment.

FIG. 10 is a view illustrating the configuration of an example of a load sensor according to the second embodiment. The load sensor 21B includes a pressure-sensitive conductive elastic member 210B that is changed in electric conductivity depending on a load, and a substrate 211B that forms variable resistance having a resistance value that varies depending on a change in electric conductivity of the pressure-sensitive conductive elastic member 210B. A sealing cover 212B covering the pressure-sensitive conductive elastic member 210B and the substrate 211B is attached to the load sensor 21B.

The pressure-sensitive conductive elastic member 210B is made by dispersing conductive particles such as carbon in a non-conductive elastic material such as rubber. The pressure-sensitive conductive elastic member 210B has a plate shape, is elastically deformable in a direction in which it is bent when receiving a load, and in addition, is elastically deformable in a direction in which it is compressed.

The substrate 211B has a pair of conductive patterns that are formed on an outer surface that is one surface facing the pressure-sensitive conductive elastic member 210B to be insulated from each other. Wiring 213B is connected to each conductive pattern. The substrate 211B includes a connecting portion 219B that has a diameter allowing air to pass therethrough and penetrates inner and outer surfaces.

The sealing cover 212B includes a pressing part 214B that presses the pressure-sensitive conductive elastic member 210B, a seal part 215B that seals a periphery of the substrate 211B, and a support part 216B that supports the pressure-sensitive conductive elastic member 210B against the substrate 211B. In the sealing cover 212B, the pressing part 214B, the seal part 215B and the support part 216B are integrally formed of the elastic material such as rubber.

In the sealing cover 212B, an internal space 218B is formed to face the pressure-sensitive conductive elastic member 210B. A portion of the pressing part 214B facing the pressure-sensitive conductive elastic member 210B in the internal space 218B includes a convex portion that protrudes in a direction of the pressure-sensitive conductive elastic member 210B. The sealing cover 212B is formed integrally with the seal part 215B, with a flexible part 217B being provided around the pressing part 214B. The flexible part 217B is formed to be thinner than the pressing part 214B and the seal part 215B, and does not inhibit the pressing part 214B from being elastically deformed in a direction in which it is separated from the pressure-sensitive conductive elastic member 210B.

The seal part 215B is shaped to seal a side of the substrate 211B and a surface in the vicinity of the side. The support part 216B protrudes from an inner peripheral portion of the seal part 215B between the pressure-sensitive conductive elastic member 210B and the substrate 211B, and supports a peripheral portion of the pressure-sensitive conductive elastic member 210B against the substrate 211B.

The sensor unit 24B includes a preventing member 240B to suppress foreign matter from entering from surroundings to the load sensor 21B. The preventing member 240B includes a load-sensor cover member 241B that exposes the sealing cover 212B and covers one side of the load sensor 21B, and a load-sensor support member 242B that seals an opposite surface of the sealing cover 212B, which is another side of the load sensor 21B.

As an example of a first cover member, the load-sensor cover member 241B includes an opening 243B that is formed in a portion facing the pressing part 214B of the sealing cover 212B to pass through inner and outer surfaces of the load-sensor cover member 241B. The load-sensor cover member 241B forms, on a side facing the load-sensor support member 242B, a recess having a shape that matches that of the seal part 215B of the sealing cover 212B, thus including a holding portion 244B. The load-sensor cover member 241B has a sealing surface 245B at a portion facing the load-sensor support member 242B on an outside of the holding portion 244B, and has a screw-hole portion 246B that passes through the sealing surface 245B.

As an example of a second cover member, the load-sensor support member 242B forms, on the inner surface of the load sensor 21B, a closed space 247B that has a predetermined volume for the internal space 218B. The load-sensor support member 242B includes a sealing surface 248B on a portion facing the load-sensor cover member 241B outside of the closed space 247B, and includes a hole portion 249B passing through the sealing surface 248B, in addition to the screw-hole portion 246B.

The sensor unit 24B comes into contact with the sealing surface 245B of the load-sensor cover member 241B and the sealing surface 248B of the load-sensor support member 242B, in the state where a portion of an inner surface of the substrate 211B of the load sensor 21B comes into contact with a portion of the sealing surface 248B of the load-sensor support member 242B and the sealing cover 212B of the load sensor 21B is put into the holding portion 244B of the load-sensor cover member 241B. By fastening the screw 25B through the hole portion 249B into the screw-hole portion 246B, the load sensor 21B is held between the load-sensor cover member 241B and the load-sensor support member 242B.

When the load sensor 21B is held between the load-sensor cover member 241B and the load-sensor support member 242B, the sealing cover 212B assumes the following state: an outer surface that is one surface of the seal part 215B is in pressure contact with the load-sensor cover member 241B, the inner surface that is another surface of the seal part 215B is in pressure contact with the load-sensor support member 242B, and the seal part 215B is compressed by a predetermined amount. The load sensor 21B is provided inside the seal part 215B such that the substrate 211B is held between the load-sensor cover member 241B and the load-sensor support member 242B. Therefore, the sealing cover 212B functions as a sealer between the sealing surface 245B of the load-sensor cover member 241B and the sealing surface 248B of the load-sensor support member 242B.

Therefore, in the sensor unit 24B, the sealing surface 245B of the load-sensor cover member 241B is in pressure contact with the sealing surface 248B of the load-sensor support member 242B, and the seal part 215B of the sealing cover 212B is compressed, so that the internal space 218B of the load sensor 21B is sealed and the closed space 247B is also sealed. A portion of the sensor unit 24A through which the wiring 213B of the load sensor 21B is taken out is sealed by the sealer 27B.

Since the sensor unit 24B is configured to prevent moisture or dust from entering into the internal space 218B of the load sensor 21B and to prevent moisture or dust from entering into the inner surface of the substrate 211B, it is possible to realize the waterproof and dustproof structure for the pressure-sensitive conductive elastic member 210B and the substrate 211B of the load sensor 21B.

The sensor unit 24B is configured such that the internal space 218B and the closed space 247B between which the substrate 211B of the load sensor 21B is connected with each other via the connecting portion 219B, and air flows between the internal space 218B and the closed space 247B.

The sensor unit 24B is attached to the support part 22B to be movable in the moving direction of the trigger 20B as well as in the directions indicated by arrows F and R. The coil spring 26B is fitted between the sensor unit 24B and the support part 22B, so that the sensor unit is biased in the direction of arrow F, namely, a direction in which it approaches the trigger 20B. A regulation part 250B enters a pin 221B formed on the support part 22B, thus regulating the moving amount of the sensor unit 24B in the direction of arrow F when it is biased by the coil spring 26B, and the moving amount of the sensor unit in the direction of arrow R when it is pressed through the trigger 20B. Thus, the sensor unit 24B, the coil spring 26B, the pin 221B, the regulation part 250B and the like constitute a load release mechanism.

In the switch 2B, the pressing convex part 202B of the trigger 20B enters the opening 243B of the load-sensor cover member 241B constituting the sensor unit 24B, and faces the sealing cover 212B of the load sensor 21B.

In the switch 2B, a first malfunction suppressing space L1 is formed between the pressing convex part 202B of the trigger 20B and the sealing cover 212B of the load sensor 21B. In the switch 2B, a second malfunction suppressing space L2 is formed between the pressing part 214B of the sealing cover 212B and the pressure-sensitive conductive elastic member 210B. In the load sensor 21B, an insulating space L3 is formed between the pressure-sensitive conductive elastic member 210B and the substrate 211B.

In the switch 2B, in the state where the insulating space L3 is formed between the pressure-sensitive conductive elastic member 210B and the substrate 211B, a resistance value of the load sensor 21B is infinite, and the load sensor 21B is in a non-conduction state.

In the switch 2B, when the trigger 20B is pulled, the trigger 20B is moved in the direction of arrow R, so that the first malfunction suppressing space L1 is reduced and the pressing convex part 202B comes into contact with the sealing cover 212B. When the trigger 20B is further pulled, the pressing convex part 202B of the trigger 20B presses the sealing cover 212B, so that the second malfunction suppressing space L2 is reduced and the pressing part 214B of the sealing cover 212B comes into contact with the pressure-sensitive conductive elastic member 210B.

When the trigger 20B is further pulled, the pressure-sensitive conductive elastic member 210B is pressed through the trigger 20B and the sealing cover 212B, so that the pressure-sensitive conductive elastic member 210B is elastically deformed in a direction where it is bent, the insulating space L3 is reduced, and the pressure-sensitive conductive elastic member 210B comes into contact with the substrate 211B.

When the trigger 20B is further pulled, the pressure-sensitive conductive elastic member 210B is pressed through the trigger 20B and the sealing cover 212B, so that the pressure-sensitive conductive elastic member 210B is elastically deformed in a direction where it is compressed, in the state where the pressure-sensitive conductive elastic member 210B is in contact with the substrate 211B.

The load sensor 21B has characteristics in which the resistance value varies depending on a deformation amount, when the pressure-sensitive conductive elastic member 210B is pressed and deformed. When the deformation amount of the pressure-sensitive conductive elastic member 210B is increased by an increase in load and the resistance value is reduced to a predetermined value, the load sensor 21B assumes a conduction state. When the load is further increased when the load sensor 21B is in the conduction state, the deformation amount of the pressure-sensitive conductive elastic member 210B is increased and the resistance value is further reduced.

As described above, since the pressure-sensitive conductive elastic member 210B is pressed through the trigger 20B, the sum of the first malfunction suppressing space L1, the second malfunction suppressing space L2 and the insulating space L3 is less than the moving amount L4 of the trigger 20B.

When it is possible to secure the insulating space L3 in an initial state where the trigger 20B is not pressed, the first malfunction suppressing space L1 and the second malfunction suppressing space L2 may not be formed. However, in consideration of a possibility that a load is applied to the pressure-sensitive conductive elastic member 210B by the dimensional tolerance of each component and the accumulation of tolerance when respective components are assembled with each other, in the initial state where the trigger 20B is not pressed, the first malfunction suppressing space L1 and the second malfunction suppressing space L2 are formed.

The insulating space L3 may be sensuously considered to be "0", in the manipulation of pulling the trigger 20B with a person's finger. Thus, the moving amount L4 of the trigger 20B is set to be 0 mm or more and 3 mm or less. When the moving amount L4 of the trigger 20B is set to be 3 mm or less, a person rarely feels a manipulation amount when pulling the trigger 20B by his or her finger. Hence, it becomes easy to control the number of rotations of the motor M according to the intensity of a force pulling the trigger 20B.

The switch 2B is configured such that a reaction force of the coil spring 26B biasing the sensor unit 24B is stronger than that of the coil spring 23B biasing the trigger 20B. Thus, in the manipulation where the trigger 20B is pulled by a normal force, the trigger 20B is moved in the direction of arrow R, so that the pressure-sensitive conductive elastic member 210B is pressed through the trigger 20B and the sealing cover 212B.

However, when the deformation amount permitted by the sealing cover 212B and the pressure-sensitive conductive elastic member 210B is exceeded and in addition, a force exceeding a predetermined level acts on the trigger 20B, the coil spring 26B is compressed, so that the sensor unit 24B is moved in the direction of arrow R and the load sensor 21B is retracted.

A moving amount L5 of the sensor unit 24B is set to allow the sensor unit 24B to move in the direction of arrow R even if the moving amount of the trigger 20B reaches a maximum (=L4). Thus, even when the trigger 20B is completely pulled as well as when the trigger 20B is being pulled, the load sensor 21B may be retracted in the direction of arrow R, and it is possible to suppress a load exceeding a predetermined level from being applied to the load sensor 21B.

In the switch 2B, when the trigger 20B presses the sealing cover 212B, the volume of the internal space 218B is reduced. In the sensor unit 24B, the sealing surface 245B of the load-sensor cover member 241B is in pressure contact with the sealing surface 248B of the load-sensor support member 242B, so that the closed space 247B is sealed but is not perfectly sealed.

Therefore, when the trigger 20B presses the sealing cover 212B, so that the volume of the internal space 218B is reduced and a pressure in the internal space 218B is increased, air in the internal space 218B may possibly leak from between the sealing surface 245B of the load-sensor cover member 241B and the sealing surface 248B of the load-sensor support member 242B to an outside. When the air leaks from the internal space 218B to the outside, a pressure of the internal space 218B becomes negative when the pressing force by the trigger 20B is released and thus the sealing cover 212B is restored to its original shape using the elasticity of the sealing cover 212B, so that it may be difficult to restore the sealing cover 212B to its original shape using the elasticity.

Hence, the internal space 218B and the closed space 247B are configured to be connected with each other via the connecting portion 219B, in the state where the substrate 211B of the load sensor 21B is interposed between the internal space and the closed space. Such a configuration allows air of the internal space 218B to flow into the closed space 247B, when the sealing cover 212B is pressed by the trigger 20B.

Since the closed space 247B has a sufficiently large volume as compared to the internal space 218B, a rise in pressure occurring when air corresponding to a volume reducing proportion of the internal space 218B flows is negligible, and the leakage of air from between the sealing surface 245B of the load-sensor cover member 241B and the sealing surface 248B of the load-sensor support member 242B is sufficiently suppressed.

Therefore, when the pressing force by the trigger 20B is released and the sealing cover 212B is intended to restore its original shape by the elasticity of the sealing cover 212B, the pressure of the internal space 218B does not become negative, and the sealing cover 212B is reliably restored to its original shape by the elasticity.

The switch 2B is configured such that the trigger 20B and the sensor unit 24B are movable, but the trigger 20B and the sensor unit 24B are independent members, and the waterproof and dustproof structure is provided in the sensor unit 24B. Thus, it is unnecessary to provide water-proofness and dust-proofness to a sliding portion, so that it is possible to realize the waterproof and dustproof structure with a simple configuration.

<Configuration Example of Switch According to Third Embodiment>

Figure 11:
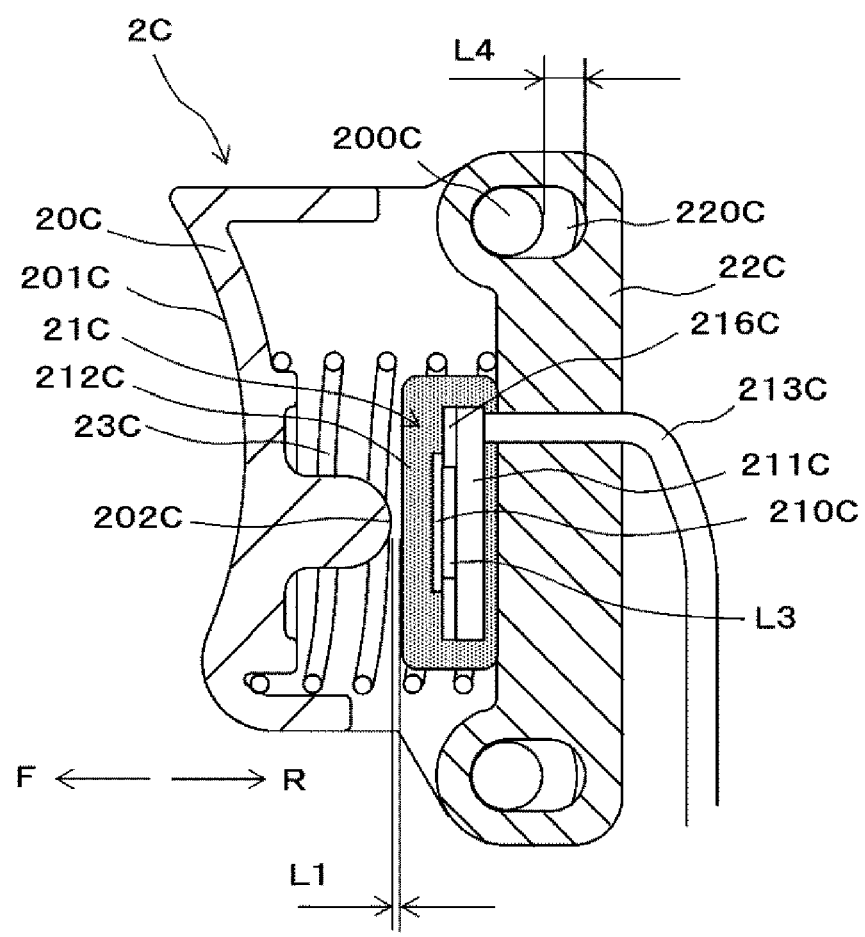
FIG. 11 is a view illustrating a configuration of an example of a switch according to a third embodiment.

FIG. 11 is a view illustrating the configuration of an example of a switch according to the third embodiment, and the switch 2C of the third embodiment will be described below in detail with reference to the respective drawings. In the impact driver 10A, the switch 2C is formed on the grip 12 in the vicinity of the electric-tool body 11. The switch 2C is provided with a trigger 20C that is manipulated by a worker, and a load sensor 21C that receives a pressing force through the trigger 20C.

The trigger 20C is an example of the switch manipulation part, and is attached to a support part 22C attached to the grip 12 illustrated in FIG. 1 to be movable in directions indicated by arrows F and R. In the present example, a pin 200C formed on the trigger 20C is fitted into an elongated hole 220C formed in a support part 22C, so that the trigger 20C is movably attached to the support part 22C while a moving amount and a moving direction are regulated.

The trigger 20C has a manipulation receiving part 201C formed on an outer surface that is one side thereof to be curved in a concave shape, for example, thus making it easy to exert a force in a direction pulling the trigger by a finger. The trigger 20C has a pressing convex part 202C formed on an inner surface that is the other side thereof to protrude in a direction of the load sensor 21C.

The switch 2C includes a coil spring 23C between the trigger 20C and a support part 22C. The trigger 20C is biased in a direction where it moves away from the load sensor 21C, that is, a direction of arrow F, by the coil spring 23C.

The switch 2C is operates as follows: when a forefinger that is a predetermined finger of a hand holding the grip 12 illustrated in FIG. 1 applies a force in a direction pulling the trigger 20C, the coil spring 23C is compressed and the trigger 20C is moved in the direction indicated by the arrow R. When a force pulling the trigger 20C becomes weak, the trigger 20C is moved in the direction indicated by the arrow F by the restoring force of the coil spring 23C.

The load sensor 21C includes a pressure-sensitive conductive elastic member 210C that is changed in electric conductivity depending on a load, a substrate 211C that forms variable resistance having a resistance value that varies depending on a change in electric conductivity of the pressure-sensitive conductive elastic member 210C, and a sealing cover 212C covering the pressure-sensitive conductive elastic member 210C and the substrate 211C.

The pressure-sensitive conductive elastic member 210C is made by dispersing conductive particles such as carbon in a non-conductive elastic material such as rubber. The pressure-sensitive conductive elastic member 210C has a plate shape, is elastically deformable in a direction in which it is bent when receiving a load, and in addition, is elastically deformable in a direction in which it is compressed.

The substrate 211C has a pair of conductive patterns that are formed on an outer surface that is one surface facing the pressure-sensitive conductive elastic member 210C to be insulated from each other. Wiring 213C is connected to each conductive pattern.

The pressure-sensitive conductive elastic member 210C is attached to the substrate 211C via the support part 216C. The support part 216C is made up of a non-conductive member, and supports a periphery of the pressure-sensitive conductive elastic member 210C again the substrate 211C.

The sealing cover 212C is made of a non-conductive elastic material such as rubber, and integrally covers the pressure-sensitive conductive elastic member 210C, the substrate 211C, and the support part 216C such that the wiring 213C is taken out.

In the switch 2C, the load sensor 21C is attached to the support part 22C in a direction where the pressure-sensitive conductive elastic member 210C is located on the substrate 211C towards the trigger 20C. The load sensor 21C is attached to the support part 22C, for example, through an attaching member (not illustrated) that is formed as an integral or independent component. Alternatively, the load sensor 21C may be attached to the support part 22C by an adhesive.

In the switch 2C, a malfunction suppressing space L1 is formed between the pressing convex part 202C of the trigger 20C and the sealing cover 212C of the load sensor 21C. In the load sensor 21C, an insulating space L3 is formed between the pressure-sensitive conductive elastic member 210C and the substrate 211C.

In the switch 2C, in the state where the insulating space L3 is formed between the pressure-sensitive conductive elastic member 210C and the substrate 211C, a resistance value of the load sensor 21C is infinite, and the load sensor 21C is in a non-conduction state.

In the switch 2C, when the trigger 20C is pulled, the trigger 20C is moved in the direction of arrow R, so that the malfunction suppressing space L1 is reduced and the pressing convex part 202C *comes* into contact with the sealing cover 212C. When the trigger 20C is further pulled, the pressing convex part 202C of the trigger 20C presses the sealing cover 212C, so that the sealing cover 212C is elastically deformed in a direction where it is bent and the pressure-sensitive conductive elastic member 210C is pressed.

When the trigger 20C is further pulled, the pressure-sensitive conductive elastic member 210C is pressed through the trigger 20C and the sealing cover 212C, so that the pressure-sensitive conductive elastic member 210C is elastically deformed in a direction where it is bent, the insulating space L3 is reduced, and the pressure-sensitive conductive elastic member 210C comes into contact with the substrate 211C.

When the trigger 20C is further pulled, the pressure-sensitive conductive elastic member 210C is pressed through the trigger 20C and the sealing cover 212C, so that the pressure-sensitive conductive elastic member 210C is elastically deformed in a direction where it is compressed, in the state where the pressure-sensitive conductive elastic member 210C is in contact with the substrate 211C.

The load sensor 21C has characteristics in which the resistance value varies depending on a deformation amount, when the pressure-sensitive conductive elastic member 210C is pressed and deformed. When the deformation amount of the pressure-sensitive conductive elastic member 210C is increased by an increase in load and the resistance value is reduced to a predetermined value, the load sensor 21C assumes a conduction state. When the load is further increased when the load sensor 21C is in the conduction state, the deformation amount of the pressure-sensitive conductive elastic member 210C is increased and the resistance value is further reduced.

As described above, since the pressure-sensitive conductive elastic member 210C is pressed through the trigger 20C, the sum of the malfunction suppressing space L1 and the insulating space L3 is less than the moving amount L4 of the trigger 20C.

When it is possible to secure the insulating space L3 in an initial state where the trigger 20C is not pressed, the malfunction suppressing space L1 may not be formed. However, in consideration of a possibility that a load is applied to the pressure-sensitive conductive elastic member 210C by the dimensional tolerance of each component and the accumulation of tolerance when respective components are assembled with each other, in the initial state where the trigger 20C is not pressed, the malfunction suppressing space L1 is formed.

The insulating space L3 may be sensuously considered to be "0", in the manipulation of pulling the trigger 20C with a person's finger. Thus, the moving amount L4 of the trigger 20C is set to be 0 mm or more and 3 mm or less. When the moving amount L4 of the trigger 20C is set to be 3 mm or less, a person rarely feels a manipulation amount when pulling the trigger 20C by his or her finger. Hence, it becomes easy to control the number of rotations of the motor M according to the intensity of a force pulling the trigger 20C.

In the switch 2C, since the pressure-sensitive conductive elastic member 210C and the substrate 211C are sealed by the sealing cover 212C, it is possible to realize the waterproof and dustproof structure with a simple configuration. Since the sealing cover 212C is interposed between the load sensor 21C and the support part 22C, the pressure-sensitive conductive elastic member 210C and the substrate 211C may be retracted in the direction of arrow R by the elasticity of the sealing cover 212C when a force exceeding a predetermined level is exerted on the trigger 20C, and a load release mechanism may be realized with a simple configuration.

<Configuration Example of Switch According to Fourth Embodiment>

Figure 12:
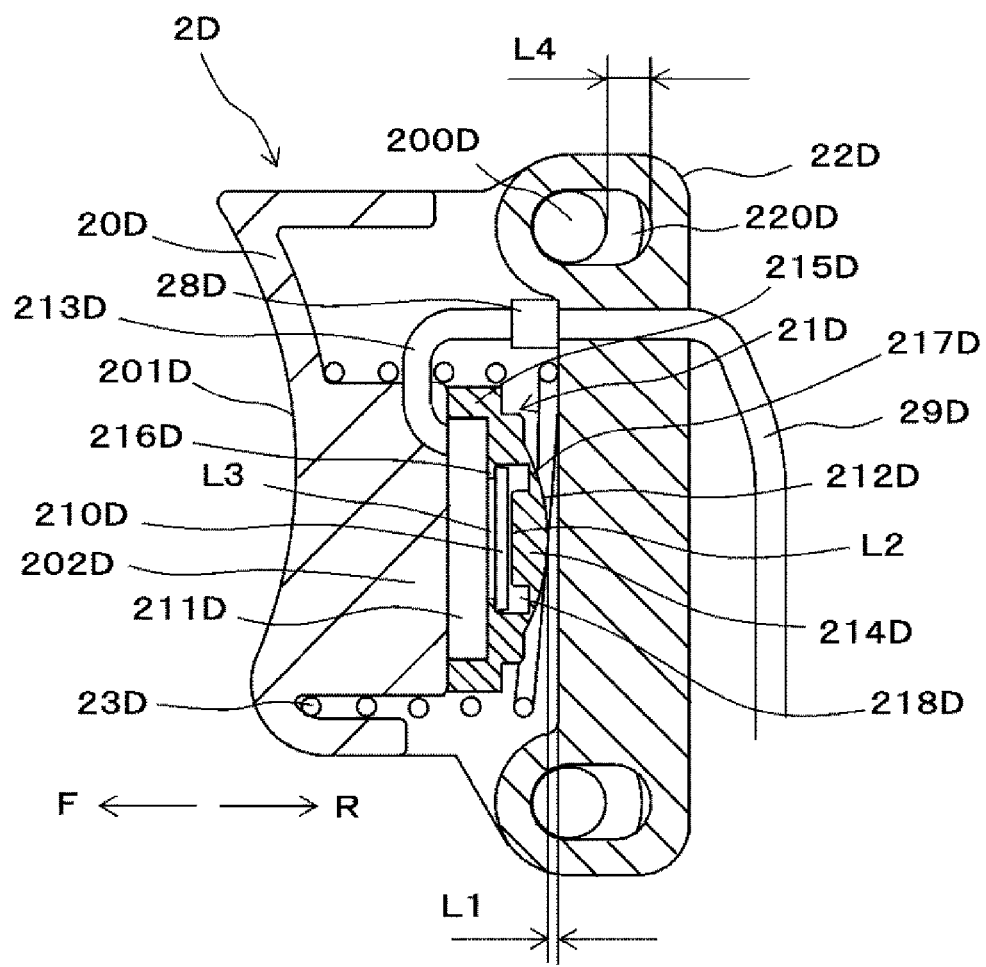
FIG. 12 is a view illustrating a configuration of an example of a switch according to a fourth embodiment.

FIG. 12 is a view illustrating the configuration of an example of a switch according to the fourth embodiment, and the switch 2D of the fourth embodiment will be described below in detail with reference to the respective drawings. In the impact driver 10A, the switch 2D is formed on the grip 12 in the vicinity of the electric-tool body 11. The switch 2D is provided with a trigger 20D that is manipulated by a worker, and a load sensor 21D that receives a pressing force through the trigger 20D.

The trigger 20D is an example of the switch manipulation part, and is attached to a support part 22D attached to the grip 12 illustrated in FIG. 1 to be movable in directions indicated by arrows F and R. In the present example, a pin 200D formed on the trigger 20D is fitted into an elongated hole 220D formed in a support part 22D, so that the trigger 20D is movably attached to the support part 22D while a moving amount and a moving direction are regulated.

The trigger 20D has a manipulation receiving part 201D formed on an outer surface that is one side thereof to be curved in a concave shape, for example, thus making it easy to exert a force in a direction pulling the trigger by a finger. The trigger 20D has, on an inner surface that is the other side thereof, a support convex part 202D to which the load sensor 21D is attached.

The switch 2D includes a coil spring 23D between the trigger 20D and a support part 22D. The trigger 20D is biased in a direction where it moves away from the support part 22D, that is, a direction of arrow F, by the coil spring 23D.

The switch 2D is operates as follows: when a forefinger that is a predetermined finger of a hand holding the grip 12 illustrated in FIG. 1 applies a force in a direction pulling the trigger 20D, the coil spring 23D is compressed and the trigger 20D is moved in the direction of the arrow R. When a force pulling the trigger 20D becomes weak, the trigger 20D is moved in the direction of the arrow F by the restoring force of the coil spring 23D.

The load sensor 21D has the same configuration as the load sensor 21A illustrated in FIG. 4, and includes a pressure-sensitive conductive elastic member 210D that is changed in electric conductivity depending on a load, and a substrate 211D that forms variable resistance having a resistance value that varies depending on a change in electric conductivity of the pressure-sensitive conductive elastic member 210D. A sealing cover 212D covering the pressure-sensitive conductive elastic member 210D and the substrate 211D is attached to the load sensor 21D.

The pressure-sensitive conductive elastic member 210D is made by dispersing conductive particles such as carbon in a non-conductive elastic material such as rubber. The pressure-sensitive conductive elastic member 210D has a plate shape, is elastically deformable in a direction in which it is bent when receiving a load, and in addition, is elastically deformable in a direction in which it is compressed.

The substrate 211D has a pair of conductive patterns that are formed on an outer surface that is one surface facing the pressure-sensitive conductive elastic member 210D to be insulated from each other. Wiring 213D is connected to each conductive pattern. The wiring 213D is connected with wiring 29D of the body by a connector 28D having a waterproof structure, for example.

The sealing cover 212D includes a pressing part 214D that presses the pressure-sensitive conductive elastic member 210D, a seal part 215D that seals a periphery of the substrate 211D, and a support part 216D that supports the pressure-sensitive conductive elastic member 210D against the substrate 211D. In the sealing cover 212D, the pressing part 214D, the seal part 215D and the support part 216D are integrally formed of the elastic material such as rubber.

In the sealing cover 212D, an internal space 218D is formed to face the pressure-sensitive conductive elastic member 210D. A portion of the pressing part 214D facing the pressure-sensitive conductive elastic member 210D in the internal space 218D includes a convex portion that protrudes in a direction of the pressure-sensitive conductive elastic member 210D. The sealing cover 212D is formed integrally with the seal part 215D, with a flexible part 217D being provided around the pressing part 214D. The flexible part 217D is formed to be thinner than the pressing part 214D and the seal part 215D, and does not inhibit the pressing part 214D from being elastically deformed in a direction in which it is separated from the pressure-sensitive conductive elastic member 210D.

The seal part 215D is shaped to seal a side of the substrate 211D and a surface in the vicinity of the side. The support part 216D protrudes from an inner peripheral portion of the seal part 215D between the pressure-sensitive conductive elastic member 210D and the substrate 211D, and supports a peripheral portion of the pressure-sensitive conductive elastic member 210D against the substrate 211D.

In the switch 2D, the load sensor 21D is attached to the support convex part 202D of the trigger 20D in a direction where the sealing cover 212D faces the support part 22D. In the switch 2D, a first malfunction suppressing space L1 is formed between the sealing cover 212D of the load sensor 21D and the support part 22D. In the switch 2D, a second malfunction suppressing space L2 is formed between the pressing part 214D of the sealing cover 212D and the pressure-sensitive conductive elastic member 210D. In the load sensor 21D, an insulating space L3 is formed between the pressure-sensitive conductive elastic member 210D and the substrate 211D.

In the switch 2D, in the state where the insulating space L3 is formed between the pressure-sensitive conductive elastic member 210D and the substrate 211D, a resistance value of the load sensor 21D is infinite, and the load sensor 21D is in a non-conduction state.

In the switch 2D, when the trigger 20D is pulled, the trigger 20D is moved in the direction of arrow R, so that the first malfunction suppressing space L1 is reduced and the sealing cover 212D comes into contact with the support part 22D. When the trigger 20D is further pulled, the sealing cover 212D is pressed on the support part 22D, so that the second malfunction suppressing space L2 is reduced and the pressing part 214D of the sealing cover 212D comes into contact with the pressure-sensitive conductive elastic member 210D.

When the trigger 20D is further pulled, the pressure-sensitive conductive elastic member 210D is pressed through the trigger 20D and the sealing cover 212D, so that the pressure-sensitive conductive elastic member 210D is elastically deformed in a direction where it is bent, the insulating space L3 is reduced, and the pressure-sensitive conductive elastic member 210D comes into contact with the substrate 211D.

When the trigger 20D is further pulled, the pressure-sensitive conductive elastic member 210D is pressed through the trigger 20D and the sealing cover 212D, so that the pressure-sensitive conductive elastic member 210D is elastically deformed in a direction where it is compressed, in the state where the pressure-sensitive conductive elastic member 210D is in contact with the substrate 211D.

The load sensor 21D has characteristics in which the resistance value varies depending on a deformation amount, when the pressure-sensitive conductive elastic member 210D is pressed and deformed. When the deformation amount of the pressure-sensitive conductive elastic member 210D is increased by an increase in load and the resistance value is reduced to a predetermined value, the load sensor 21D assumes a conduction state. When the load is further increased when the load sensor 21D is in the conduction state, the deformation amount of the pressure-sensitive conductive elastic member 210D is increased and the resistance value is further reduced.

As described above, since the pressure-sensitive conductive elastic member 210D is pressed through the trigger 20D, the sum of the first malfunction suppressing space L1, the second malfunction suppressing space L2 and the insulating space L3 is less than the moving amount L4 of the trigger 20D.

When it is possible to secure the insulating space L3 in an initial state where the trigger 20D is not pressed, the first malfunction suppressing space L1 and the second malfunction suppressing space L2 may not be formed. However, in consideration of a possibility that a load is applied to the pressure-sensitive conductive elastic member 210D by the dimensional tolerance of each component and the accumulation of tolerance when respective components are assembled with each other, in the initial state where the trigger 20D is not pressed, the first malfunction suppressing space L1 and the second malfunction suppressing space L2 are formed.

The insulating space L3 may be sensuously considered to be "0", in the manipulation of pulling the trigger 20D with a person's finger. Thus, the moving amount L4 of the trigger 20D is set to be 0 mm or more and 3 mm or less. When the moving amount L4 of the trigger 20D is set to be 3 mm or less, a person rarely feels a manipulation amount when pulling the trigger 20D by his or her finger. Hence, it becomes easy to control the number of rotations of the motor M according to the intensity of a force pulling the trigger 20D.

In the switch 2D, the load sensor 21D is attached to the trigger 20D, so that the trigger 20D may also be replaced during the replacement of the load sensor 21D, thus improving workability.

<Configuration Example of Switch According to Fifth Embodiment>

Figure 13:
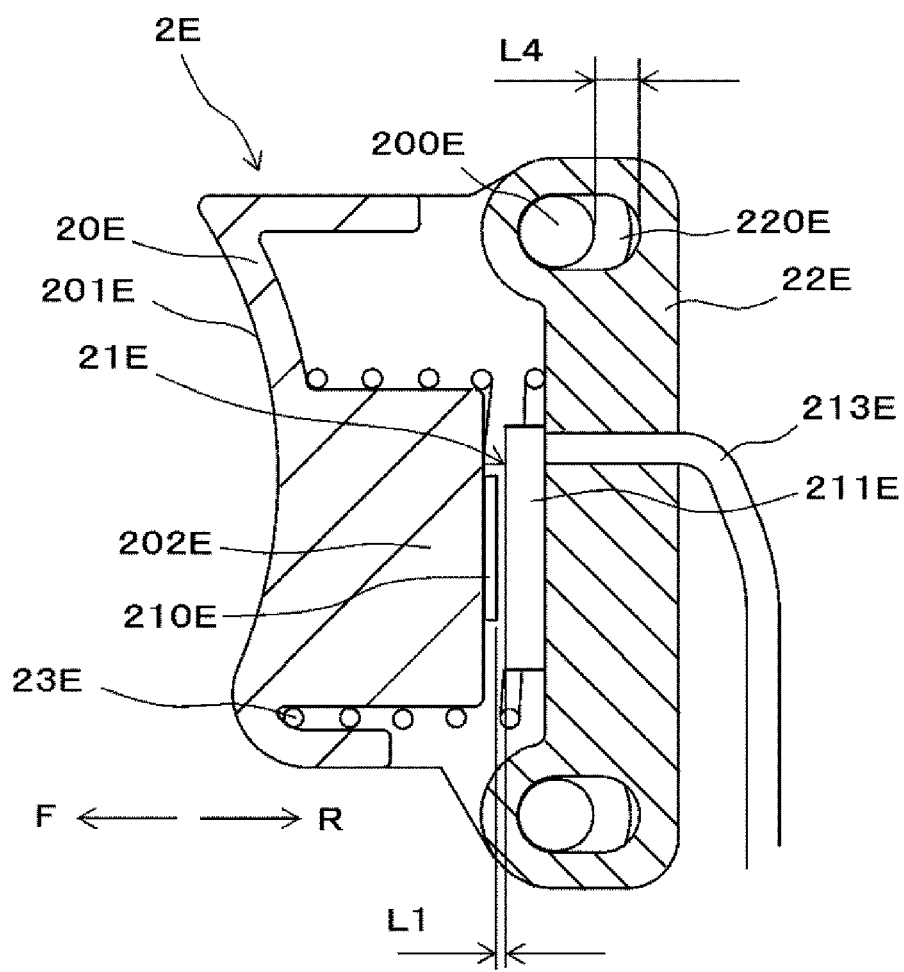
FIG. 13 is a view illustrating a configuration of an example of a switch according to a fifth embodiment.

FIG. 13 is a view illustrating the configuration of an example of a switch according to the fifth embodiment, and the switch 2E of the fifth embodiment will be described below in detail with reference to the respective drawings. In the impact driver 10A, the switch 2E is formed on the grip 12 in the vicinity of the electric-tool body 11. The switch 2E is an example of the switch, and includes a trigger 20E that is manipulated by a worker, and a load sensor 21E that receives a pressing force through the trigger 20E.

The trigger 20E is an example of the switch manipulation part, and is attached to a support part 22E attached to the grip 12 illustrated in FIG. 1 to be movable in directions indicated by arrows F and R. In the present example, a pin 200E attached to the trigger 20E is fitted into an elongated hole 220E formed in a support part 22E, so that the trigger 20E is movably attached to the support part 22E while a moving amount and a moving direction are regulated.

The trigger 20E has a manipulation receiving part 201E formed on an outer surface that is one side thereof to be curved in a concave shape, for example, thus making it easy to exert a force in a direction pulling the trigger by a finger. The trigger 20E has, on an inner surface that is the other side thereof, a support convex part 202E to which a pressure-sensitive conductive elastic member 210E of the load sensor 21E is attached.

The switch 2E includes a coil spring 23E between the trigger 20E and a support part 22E. The trigger 20E is biased in a direction where it moves away from the support part 22E, that is, a direction of arrow F, by the coil spring 23E.

The switch 2E is operates as follows: when a forefinger that is a predetermined finger of a hand holding the grip 12 illustrated in FIG. 1 applies a force in a direction pulling the trigger 20E, the coil spring 23E is compressed and the trigger 20E is moved in the direction of the arrow R. When a force pulling the trigger 20E becomes weak, the trigger 20E is moved in the direction of the arrow F by the restoring force of the coil spring 23E.

The load sensor 21E includes the pressure-sensitive conductive elastic member 210E that is changed in electric conductivity depending on a load, and a substrate 211E that forms variable resistance having a resistance value that varies depending on a change in electric conductivity of the pressure-sensitive conductive elastic member 210E.

The pressure-sensitive conductive elastic member 210E is made by dispersing conductive particles such as carbon in a non-conductive elastic material such as rubber. The pressure-sensitive conductive elastic member 210E has a plate shape and is elastically deformable in a direction in which it is compressed when receiving a load.

The substrate 211E has a pair of conductive patterns that are formed on an outer surface that is one surface facing the pressure-sensitive conductive elastic member 210E to be insulated from each other. Wiring 213E is connected to each conductive pattern.

In the switch 2E, the pressure-sensitive conductive elastic member 210E is attached to the support convex part 202E of the trigger 20E, and the substrate 211E is attached to the support part 22E. In the switch 2E, an insulating space L3 is formed between the pressure-sensitive conductive elastic member 210E and the substrate 211E. The insulating space L3 serves as a malfunction suppressing space.

In the switch 2E, in the state where the insulating space L3 is formed between the pressure-sensitive conductive elastic member 210E and the substrate 211E, a resistance value of the load sensor 21E is infinite, and the load sensor 21E is in a non-conduction state.

In the switch 2E, when the trigger 20E is pulled, the trigger 20E is moved in the direction of arrow R, so that the insulating space L3 is reduced and the pressure-sensitive conductive elastic member 210E comes into contact with the substrate 211E.

When the trigger 20E is further pulled, the pressure-sensitive conductive elastic member 210E is pressed through the trigger 20E, so that the pressure-sensitive conductive elastic member 210E is elastically deformed in a direction where it is compressed, in the state where the pressure-sensitive conductive elastic member 210E is in contact with the substrate 211E.

The load sensor 21E has characteristics in which the resistance value varies depending on a deformation amount, when the pressure-sensitive conductive elastic member 210E is pressed and deformed. When the deformation amount of the pressure-sensitive conductive elastic member 210E is increased by an increase in load and the resistance value is reduced to a predetermined value, the load sensor 21E assumes a conduction state. When the load is further increased when the load sensor 21E is in the conduction state, the deformation amount of the pressure-sensitive conductive elastic member 210E is increased and the resistance value is further reduced.

As described above, since the pressure-sensitive conductive elastic member 210E is pressed through the trigger 20E, the insulating space L3 is smaller than the moving amount L4 of the trigger 20E. The insulating space L3 may be sensuously considered to be "0", in the manipulation of pulling the trigger 20E with a person's finger. Thus, the moving amount L4 of the trigger 20E is set to be 0 mm or more and 3 mm or less. When the moving amount L4 of the trigger 20E is set to be 3 mm or less, a person rarely feels a manipulation amount when pulling the trigger 20E by his or her finger. Hence, it becomes easy to control the number of rotations of the motor M according to the intensity of a force pulling the trigger 20E.

In the switch 2E, the pressure-sensitive conductive elastic member 210E of the load sensor 21E is attached to the trigger 20E, so that the trigger 20E may also be replaced during the replacement of the pressure-sensitive conductive elastic member 210E, thus improving workability. Since the entire load sensor 21E is not replaced with another one, cost is saved.

<Activating Operation Example of Control Unit>

Next, the activating operation of the control unit 3 equipped with the above-described switches 2A to 2E will be described with reference to the respective drawings. In the following description, the switches 2A to 2E are simply referred to as the switch 2, and the load sensors 21A to 21E are simply referred to as the load sensor 21. The pressure-sensitive conductive elastic members 210A to 210E are simply referred to as the pressure-sensitive conductive elastic member 210, and the substrates 211A to 211E are simply referred to as the substrate 211.

The control unit 3 detects a resistance value R of the load sensor 21 that is changed when the pressure-sensitive conductive elastic member 210 is pressed by the manipulation of the switch 2, and then outputs a control signal Dd depending on the detected resistance value. Since the resistance value R of the load sensor 21 is changed by the force pressing the trigger 20, it is possible to control the motor M in response to a control signal Dd due to acceleration/deceleration manipulation of the trigger 20 by a user. An illumination system such as an LED may be prepared as the electric component.

The control circuit 4 is an activation circuit of the control unit 3, and forms a circuit that causes an electric current to flow from the power supply unit 5 to the control unit 3 when the resistance value R of the load sensor 21 is reduced from an initial value by a predetermined amount, when the pressure-sensitive conductive elastic member 210 is pressed by manipulating the switch 2.

The control circuit 4 includes, for example, a first switch circuit 41 that is a first switch unit including a transistor Tr1, a resistor or the like, and a second switch circuit 42 that is a second switch unit including a transistor Tr2, a resistor or the like.

As described above, in the state where the trigger 20 is not pressed and the insulating space L3 is formed between the pressure-sensitive conductive elastic member 210 and the substrate 211, the resistance value of the load sensor 21 is infinite and the load sensor 21 is in a non-conduction state. Thus, since the transistor Tr1 of the first switch circuit 41 is in an OFF state and no electric current flows in the transistor Tr1, power is not fed from the power supply unit 5 to a power supply driver 53, and a predetermined voltage is not applied from the power supply driver 53 to the control unit 3. Since the control unit 3 is not activated, the transistor Tr2 of the second switch circuit 42 is in an OFF state, and no electric current flows in the transistor Tr2. Therefore, a state where power is interrupted is realized.

In the switch 2, when the trigger 20 is pulled, the insulating space L3 is reduced, and the pressure-sensitive conductive elastic member 210 comes into contact with the substrate 211. When the trigger 20 is further pulled and the pressure-sensitive conductive elastic member 210 coming into contact with the substrate 211 is deformed in a direction where it is compressed by a predetermined amount, the load sensor 21 is in a conduction state.

When the load sensor 21 is in the conduction state, the transistor Tr1 of the first switch circuit 41 is in an ON state and an electric current flows in the transistor Tr1. As the electric current flows in the transistor Tr1, power is fed from the power supply unit 5 to the power supply driver 53, and a predetermined voltage Vcc is applied from the power supply driver 53 to the control unit 3. The control unit 3 is activated.

When the control unit 3 is activated, a power supply maintenance signal Dk is output from the control unit 3, the transistor Tr2 of the second switch circuit 42 is in an ON state, and an electric current flows in the transistor Tr2. Therefore, in the power supply maintenance circuit 43, the transistor Tr1 of the first switch circuit 41 is maintained in the ON state, and the feeding of power from the power supply unit 5 to the power supply driver 53 is possible.

Thus, when a user presses the trigger 20 by his or her finger to operate the electric tool 1A, such as the impact driver 10A, the control unit 3 may be activated in the initial state where the load applied to the load sensor 21 through the trigger 20 is low.

In the load sensor 21, the resistance value R varies depending on the load applied to the pressure-sensitive conductive elastic member 210 through the trigger 20. The control unit 3 inputs the resistance value R of the load sensor 21 from a resistance-value detection circuit 44, outputs a control signal Dd, which depends on the resistance value R of the load sensor 21 and controls an output value of pulse width modulation (PWM), for example, to a driving circuit 6, and controls the motor M. Thus, it is possible to control the intensity of the force pulling the trigger 20 and the number of rotations of the motor M.

When the force for pulling the trigger 20 is reduced and the load sensor is restored to the state where the insulating space L3 is formed between the pressure-sensitive conductive elastic member 210 and the substrate 211, the load sensor 21 is in the non-conduction state. When it is determined that the resistance value R of the load sensor 21 has a predetermined value, namely, an infinite value in the present example, the control unit 3 outputs the control signal Dd to stop rotating the motor M. Thus, as the force for pulling the trigger 20 is reduced below a predetermined level or the finger is released from the trigger 20, the motor M stops rotating.

For a predetermined waiting time after the resistance value R of the load sensor 21 has reached the infinite value, the control unit 3 continues to output the power supply maintenance signal Dk. Thus, even if the load sensor 21 assumes the non-conduction state, the feeding of power from the power supply unit 5 to the power supply driver 53 is continued, and the feeding of voltage Vcc from the power supply driver 53 to the control unit 3 is continued.

If a predetermined waiting time is elapsed after the resistance value R of the load sensor 21 has reached the infinite value, the control unit 3 stops outputting the power supply maintenance signal Dk. Thus, the transistor Tr2 in the second switch circuit 42 is in the OFF state and no electric current flows in the transistor Tr2. The transistor Tr1 in the first switch circuit 41 is in the OFF state. Since both the first switch circuit 41 and the second switch circuit 42 are in the OFF state, power is not fed from the power supply unit 5 to the power supply driver 53, and voltage Vcc is not applied from the power supply driver 53 to the control unit 3. Therefore, a state where power is interrupted is realized.

Therefore, in order to activate the control unit 3, it is unnecessary to form a switch different from the load sensor 21, and it is possible to activate the control unit 3 and control the motor M by the control unit 3, with one set of switches 2 using the load sensor 21.

Therefore, a reduction in size of the switch 2 is possible. The reduction in size of the switch 2 may decrease an area in the grip 12 occupied by the switch 2, and consequently may achieve a reduction in size of the entire apparatus.

A moving amount L4 that is a stroke of the trigger 20 required to operate the control circuit 4 is not limited particularly as long as it is possible to secure at least the insulating space L3 descried in each embodiment, and the moving amount L4 of the trigger 20 may be set to be smaller than that of a conventional sliding type switch. Furthermore, since the moving amount L4 of the trigger 20 may be selected depending on the presence of the first malfunction suppressing space L1 and the second malfunction suppressing space L2 and the amounts of the first malfunction suppressing space L1 and the second malfunction suppressing space L2, a degree of freedom upon determining the moving amount L4 of the trigger 20 is improved.

The load sensor may be configured such that conductive patterns are formed on both sides of the pressure-sensitive conductive elastic member, and the pressure-sensitive conductive elastic member is elastically deformed in a direction where it is compressed, thus changing a conduction state on the inner and outer surfaces of the pressure-sensitive conductive elastic member and the resistance value.

<Alternative of Electric Tool of the Present Embodiment>

Figure 14:
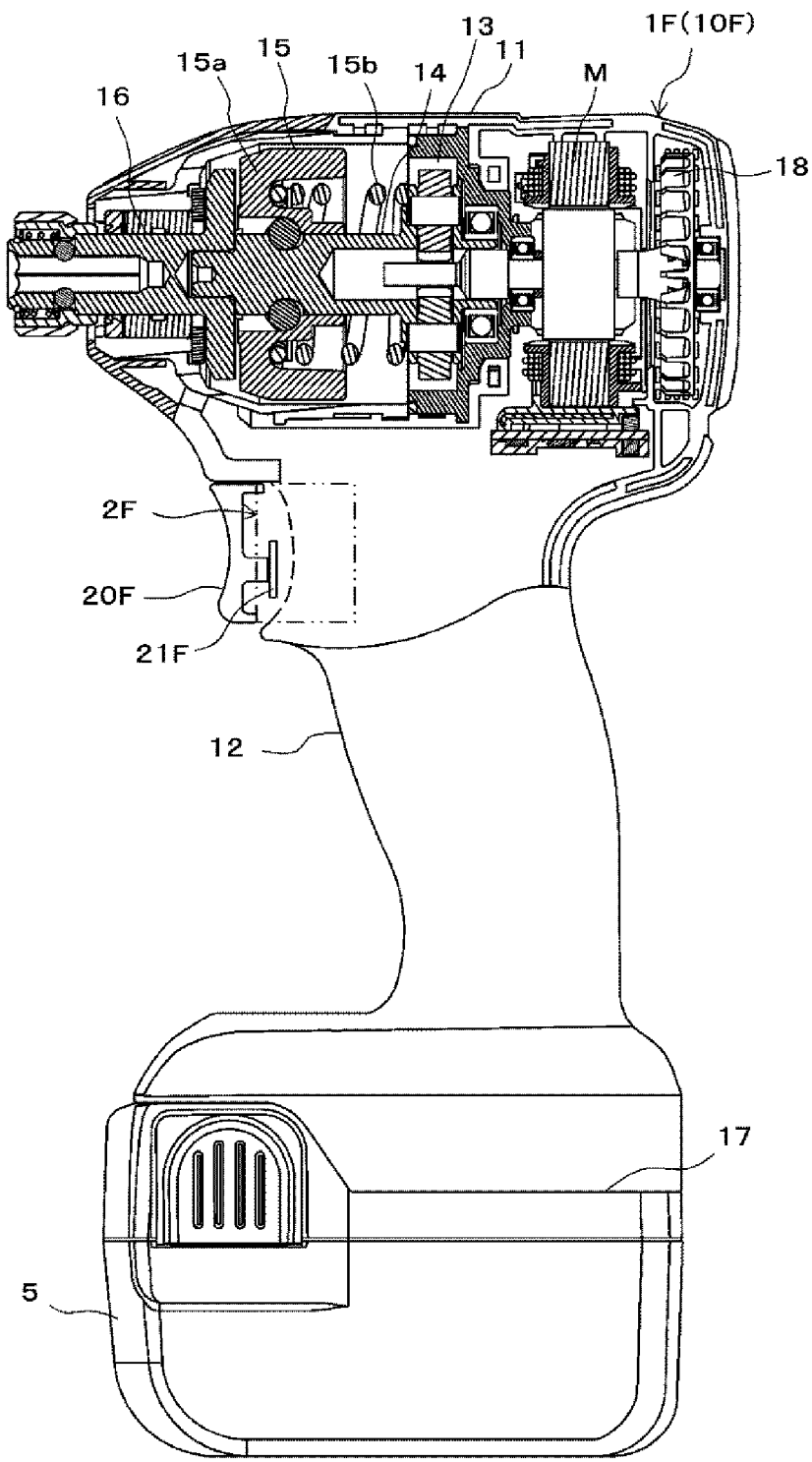
FIG. 14 is a view illustrating an overall configuration of an alternative of an electric tool according to the present embodiment.
Figure 15:
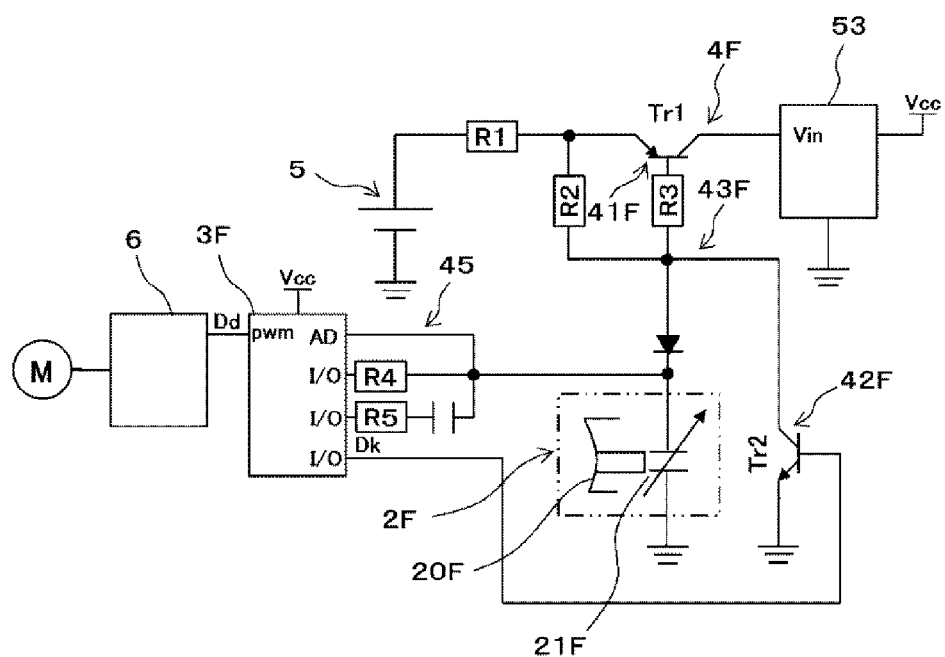
FIG. 15 is a block diagram illustrating an example of a circuit configuration of the alternative of the electric tool according to the present embodiment.

FIG. 14 is a view illustrating an overall configuration of an alternative of an electric tool according to the present embodiment, and FIG. 15 is a block diagram illustrating an example of a circuit configuration of the alternative of the electric tool according to the present embodiment.

Since an impact driver 10F that is the electric tool 1F according to the alternative of the present embodiment remains the same as the electric tool 1 A illustrated in FIG. 1 except for the switch 2F, the description of components other than the switch 2F will be omitted herein. The electric tool 1F has a variable capacitance load sensor 21F as the switch 2F.

The variable capacitance load sensor 21F has a pair of conductors on opposite sides of a dielectric, thus constituting a capacitor. One side of the pair of conductors of the load sensor 21F is formed of an elastic material, for example, and a distance between the conductors is changed as load is applied in a predetermined direction where the conductors come close to each other. Further, a distance between the conductors is changed depending on the magnitude of the load, so that the capacitance C is changed. The load sensor 21F sets its capacitance C to 0 when no load is applied thereto, and the capacitance C is increased in proportion to an increase in load. Further, the capacitance C that is increased in proportion to the increase in load is reduced in proportion to a reduction in load.

The switch 2F is configured to be movable in directions where a trigger 20F comes close to or moves away from the load sensor 21F. In a state where no trigger 20F is pulled, the load sensor 21F is kept unloaded.

In the switch 2F, when the trigger 20F is pulled by a person's finger, the load sensor 21F is pressed by the trigger 20F, and load acting on the load sensor 21F is changed according to the intensity of a force pulling the trigger 20F. In the switch 2F, when the force pulling the trigger 20F is increased, the load acting on the load sensor 21F is increased, so that the capacitance C of the load sensor 21F is increased. In contrast, in the switch 2F, when the force pulling the trigger 20F is reduced, the load acting on the load sensor 21F is reduced, so that the capacitance C of the load sensor 21F is reduced.

<Activating Operation Example of Control Unit of Alternative Electric Tool>

Next, the activating operation of the control unit 3F equipped with the above-described switch 2F will be described with reference to FIG. 15.

The control unit 3F detects the capacitance C of the load sensor 21F that is changed when the load sensor 21F is pressed by the manipulation of the trigger 20F, and then outputs a control signal Dd depending on the detected capacitance C. Since the capacitance C of the load sensor 21F is changed by the load acting on the load sensor 21F, the control signal Dd changed depending on an increase or reduction in force of a user manipulating the trigger 20F is output, and a motor M may be controlled depending on an increase or reduction in force manipulating the trigger 20F.

The control circuit 4F is an activation circuit of the control unit 3F, and forms a circuit that causes an electric current to flow from the power supply unit 5 to the control unit 3F if the capacitance C of the load sensor 21F is increased from an initial value by a predetermined amount, when the load sensor 21F is pressed by manipulating the switch 2F.

The control circuit 4F includes, for example, a first switch circuit 41F that is a first switch unit including a transistor Tr1, a resistor or the like, and a second switch circuit 42F that is a second switch unit including a transistor Tr2, a resistor or the like.

In the switch 2F, when manipulation of pulling the trigger 20F is not performed and no load is applied to the load sensor 21F, the capacitance C of the load sensor 21F is zero. Thus, the resistance value of the load sensor 21F is infinite and the load sensor 21F is in a non-conduction state. Since no current flows in the load sensor 21F, the transistor Tr1 of the first switch circuit 41F is in an OFF state and no current flows in the transistor Tr1. Thus, power is not fed from the power supply unit 5 to a power supply driver 53, and voltage is not applied from the power supply driver 53 to the control unit 3F. Therefore, the control unit 3F is not activated.

Further, since the control unit 3F is not activated, the transistor Tr2 of the second switch circuit 42F is in an OFF state, and no current flows in the transistor Tr2. Thus, power is not fed from the power supply unit 5 to the power supply driver 53, and voltage is not applied from the power supply driver 53 to the control unit 3F. Therefore, a state in which power is cut off is realized.

In the switch 2F, if the load sensor 21F is pressed by pulling the trigger 20F, the capacitance C of the load sensor 21F increases from zero. Thus, inrush current flows in the load sensor 21F, and the capacitor constituting the load sensor 21F is charged, so that the load sensor 21F is in a conduction state.

When the load sensor 21F becomes the conduction state, the transistor Tr1 of the first switch circuit 41F becomes an ON state, and current flows in the transistor Tr1. Since current flows in the transistor Tr1, power is fed from the power supply unit 5 to the power supply driver 53, a predetermined voltage Vcc is applied from the power supply driver 53 to the control unit 3F, and the control unit 3F is activated.

When the control unit 3F is activated, a power supply maintenance signal Dk is output from the control unit 3F, the transistor Tr2 of the second switch circuit 42F is in ON state, and current flows in the transistor Tr2. Therefore, in a power supply maintenance circuit 43F, the transistor Tr1 of the first switch circuit 41F is maintained in ON state, and power may be fed from the power supply unit 5 to the power supply driver 53.

Thus, when a user pulls the trigger 20F of the electric tool 1F with his or her finger and the load sensor 21F is pressed by the trigger 20F, it is possible to activate the control unit 3F through the trigger 20F, in an initial stage where the load acting on the load sensor 21F is low.

In the load sensor 21F, the capacitance C varies depending on the applied load through the trigger 20. The control unit 3F detects the capacitance C of the load sensor 21F using a detection circuit 45, outputs a control signal Dd which controls an output value of pulse width modulation (PWM), for example, depending on the capacitance C of the load sensor 21F, to a driving circuit 6, and controls the motor M. Thus, it is possible to control the intensity of the force pulling the trigger 20 and the number of revolutions of the motor M.

Further, when a force for pulling the trigger 20F is weakened and the load sensor 21F returns to an unloaded state, the capacitor constituting the load sensor 21F is discharged, so that the capacitance C becomes zero. If it is determined that the capacitance C of the load sensor 21F becomes zero, the control unit 3F outputs the control signal Dd to stop rotating the motor M. Thus, the motor M stops rotating by decreasing the force for pulling the trigger 20F below a predetermined level at which no load is applied to the load sensor 21F, or releasing the finger from the trigger 20F.

For a predetermined waiting time after the capacitance C of the load sensor 21F becomes zero, the control unit 3F continues outputting the power supply maintenance signal Dk. Thus, even when the load sensor 21F becomes the non-conduction state, power is continuously fed from the power supply unit 5 to the power supply driver 53, and voltage Vcc is continuously supplied from the power supply driver 53 to the control unit 3F.

When a predetermined waiting time has elapsed after the capacitance C of the load sensor 21F became zero, the control unit 3F stops outputting the power supply maintenance signal Dk. Thus, the transistor Tr2 of the second switch circuit 42F becomes an OFF state, and no current flows in the transistor Tr2. Likewise, the transistor Tr1 of the first switch circuit 41F becomes an OFF state. Since both the first switch circuit 41F and the second switch circuit 42F become the OFF state, power is not fed from the power supply unit 5 to the power supply driver 53, and voltage Vcc is not applied from the power supply driver 53 to the control unit 3F. Therefore, power is cut off.

Therefore, although the variable capacitance load sensor 21F is employed, in order to activate the control unit 3F, it is unnecessary to form a switch different from the load sensor 21F, and it is possible to activate the control unit 3F and control the motor M by the control unit 3F, with one set of switches 2 using the load sensor 21F.

Therefore, a reduction in size of the switch 2F is possible. The reduction in size of the switch 2F may decrease an area in the grip 12 occupied by the switch 2F, and consequently may achieve a reduction in size of the entire apparatus.

Further, although the variable capacitance load sensor 21F is employed, the moving amount of the trigger 20F for activating the control unit 3F and controlling the motor M by the control unit 3F may be reduced as compared to a conventional sliding type switch.

Further, in the above description, the impact driver has been exemplified as the electric tool. However, the invention may be applied to an electric driver having no hitting mechanism, an electric saw, an electric file or the like, and the switch 2 (2A to 2F) of each embodiment may be applied to the manipulation part that manipulates the rotation of the motor of the electric tool. The load sensor 21A to 21F of each embodiment may be provided as a switch other than the manipulation part for manipulating the rotation of the motor. The power supply unit may be a detachable battery as well as a configuration operated by supplying AC power using a power cable.

The tool may have a configuration that is operated by gas pressure such as air or gas or by liquid pressure such as oil, and may control the electric component such as an electronic valve that regulates the opening and closing of the valve and an opening degree thereof, via the switch applying the load sensor 21A to 21F of each embodiment to manipulate the electric component.

(1) A tool comprising:
  a switch that is configured to cause an electric component to operate; and
  a handle that is held by a hand to manipulate the switch, wherein the switch includes:
  a switch manipulation part to be manipulated; and
  a load sensor that is configured to receive a pressing force through the switch manipulation part, and
  wherein the load sensor includes a pressure-sensitive conductive elastic member in which conductive particles are dispersed in a non-conductive elastic material.

(2) The tool according to (1), further comprising:
  a control unit that is configured to control the electric component; and
  a control circuit that is configured to supply power to the control unit,
  wherein the load sensor is configured to cause the control circuit to operate, when a load is applied to the load sensor by the manipulation of the switch manipulation part, and
  wherein the control unit is configured to control the electric component according to change of the load applied to the load sensor.

(3) The tool according to (1) or (2),
  wherein the load sensor is in a non-conduction state in a state where no load is applied to the switch manipulation part and where a main body of the tool is powered on.

(4) The tool according to (1) or (2),
wherein a resistance value of the load sensor is infinite in a state where no load is applied to the switch manipulation part and where a main body of the tool is powered on.
(5) The tool according to any one of (1) to (4),
wherein a resistance value of the load sensor is reduced as the load increases.
(6) The tool according to any one of (1) to (5),
wherein the switch manipulation part of the switch is provided at a location where the switch manipulation part is to be manipulated by a predetermined finger of a hand holding the handle.
(7) The tool according to any one of (1) to (6),
wherein the switch is configured such that a space is provided between the switch manipulation part and the load sensor, in a state where no load is applied to the switch manipulation part.
(8) The tool according to any one of (1) to (7),
wherein the switch further includes a load release mechanism to move the load sensor relative to the switch manipulation part along a direction where the switch manipulation part and the load sensor are separated from each other, in a moving direction of the switch manipulation part receiving a load.
(9) The tool according to any one of (1) to (8),
wherein a movable amount of the switch manipulation part is set to be 3 mm or less.
(10) The tool according to any one of (1) to (9),
wherein, when the load sensor is pressed and deformed, a resistance value of the load sensor varies according to a deformation amount of the load sensor,
wherein, when the deformation amount is increased by a increase of load and the resistance value is reduced to a predetermined value, the load sensor is in a conduction state, and
wherein, when the load is further increased in a state where the load sensor is in the conduction state, the deformation amount is further increased and the resistance value is further reduced so as to control the number of rotations of a motor of the tool according to the resistance value.
(11) A tool comprising:
a switch that is configured to cause an electric component to operate; and
a handle that is held by a hand to manipulate the switch,
wherein the switch includes:
a switch manipulation part to be manipulated;
a load sensor that is configured to receive a pressing force through the switch manipulation part;
wherein the tool further comprises;
a control unit that is configured to control the electric component according to change of a load applied to the load sensor by manipulating the switch manipulation part; and
a control circuit that is configured to supply power to the control unit, when the load is applied to the load sensor by manipulating the switch manipulation part.
(12) The tool according to (11),
wherein, when the control unit detects a state where no load is applied to the load sensor, the control circuit stops the supply of power to the control unit after a waiting time is passed.
(13) The tool according to (12),
wherein the control circuit includes:
a first switch unit which is operated when a load is applied to the load sensor; and
a second switch unit which is operated by the control unit and which maintains the first switch unit in an operated state, and wherein the control unit outputs a power supply maintenance signal to operate the second switch unit when the first switch unit is operated to supply power, and stops outputting the power supply maintenance signal after the waiting time is passed when no load is applied to the load sensor.
(14) The tool according to any one of (11) to (13),
wherein a resistance value of the load sensor changes according to change of the load, and
wherein the control unit outputs a control signal according to the resistance value of the load sensor.
(15) The tool according to any one of (11) to (13),
wherein capacitance of the load sensor changes according to change of the load, and
wherein the control unit outputs a control signal according to the capacitance of the load sensor.

What is claimed is:
1. A tool comprising:
a switch that is configured to cause an electric component to operate;
a handle;
a control unit that is configured to control the electric component; and
a control circuit that is configured to cause an electric current to flow to the control unit from a power supply unit,
wherein the switch includes:
a switch manipulation part to be manipulated, the switch manipulation part being located on the handle and including a pressing part;
a load sensor that is configured to receive a pressing force through the switch manipulation part, wherein the switch manipulation part is configured to apply the pressing force against the load sensor by the pressing part of the switch manipulation part pressing on a load sensor pressing part location, wherein the load sensor includes a pressure-sensitive conductive elastic member in which conductive particles are dispersed in a non-conductive elastic material, and a substrate, wherein the pressure-sensitive conductive elastic member includes a first side facing toward the load sensor pressing part location and a second side facing the substrate, and wherein the load sensor has a resistance value which varies according to a deformation amount of the pressure-sensitive conductive elastic member when the pressure-sensitive conductive elastic member is pressed and deformed,
wherein when the switch manipulation part is not actuated, at least one gap larger than 0 mm is provided between the first side of the pressure-sensitive conductive elastic member and the load sensor pressing part location or between the second side of the pressure-sensitive conductive elastic member and the substrate, and wherein an initial actuation of the switch manipulation part closes the at least one gap, and further actuation of the switch manipulation part after the initial actuation increases a load upon the pressure-sensitive conductive elastic member,
wherein the control circuit includes:
a first switch circuit that is configured not to cause an electric current to flow from the power supply unit to the control unit in a state where the load sensor is not receiving the pressing force though the switch manipulation part, and to cause an electric current to flow from the power supply unit to the control unit once the resistance value of the load sensor is reduced from an initial value by a predetermined amount when the pressure-sensitive conductive elastic member is pressed in the initial actuation of the switch manipulation part; and a resistance value detection circuit that is configured to detect the resistance value of the load sensor which varies by the further actuation of the switch manipulation part after the initial actuation, and wherein the control unit is configured to, after power is supplied from the power supply unit, variably control the electric component according to the resistance value of the load sensor detected by the resistance value detection circuit.

2. The tool according to claim 1,
wherein a resistance value of the load sensor is infinite in a state where no load is applied to the switch manipulation part.

3. The tool according to claim 1,
wherein the switch is configured such that a space is provided between the pressing part of the switch manipulation part and the load sensor pressing part location, in a state where no load is applied to the switch manipulation part.

4. The tool according to claim 1,
wherein the switch further includes a load release mechanism to move the load sensor relative to the switch manipulation part along a direction where the switch manipulation part and the load sensor are separated from each other, in a moving direction of the switch manipulation part receiving a load.

5. The tool according to claim 1,
wherein, when the deformation amount of the pressure-sensitive conductive elastic member is increased by an increase of load and the resistance value is reduced to a predetermined value, the load sensor is in a conduction state, and wherein, when the load is further increased in a state where the load sensor is in the conduction state by the further actuation of the switch manipulation part after the initial actuation, the deformation amount of the pressure-sensitive conductive elastic member is further increased and the resistance value is further reduced so as to control a number of rotations of a motor of the tool according to the resistance value.

6. The tool according to claim 1,
wherein, when the control unit detects a state where no load is applied to the load sensor pressing part location, the control circuit stops supplying power to the control unit after a waiting time is passed.

7. The tool according to claim 6,
wherein the control circuit further includes:
a second switch circuit which is configured to maintain the first switch circuit in an operated state based on a power supply maintenance signal output from the control unit, and
wherein the control unit outputs the power supply maintenance signal to operate the second switch circuit so as to maintain the first switch circuit in the operated state when the first switch circuit is operated to supply power, and stops outputting the power supply maintenance signal after the waiting time is passed when no load is applied to the load sensor pressing part location.

8. The tool according to claim 1,
wherein the control unit outputs a control signal according to the resistance value of the load sensor.

9. The tool according to claim 1,
wherein the at least one gap des a first gap between the second side of the pressure-sensitive conductive elastic member and the substrate;
wherein the initial actuation of the switch manipulation part closes the first gap to establish contact between the pressure-sensitive conductive elastic member and the substrate, and in response thereto, the control circuit supplies power to the control unit; and
wherein the further actuation of the switch manipulation part varies a resistance of the pressure-sensitive conductive elastic member with the load applied to the pressure-sensitive conductive elastic member, and in response thereto the control unit variably controls the electric component based on the resistance of the pressure-sensitive conductive elastic member.

10. The tool according to claim 9, wherein the at least one gap further includes a second gap between the first side of the pressure-sensitive conductive elastic member and the load sensor pressing part location, and the initial actuation of the switch manipulation part closes both the first gap and the second gap.

11. The tool according to claim 10, wherein the switch manipulation part has a total stroke movement amount of 3 mm or less and larger than 0 mm, and a sum of a size of the first gap and a size of the second gap is less than the total stroke movement amount of the switch manipulation part.

12. The tool according to claim 1,
wherein the initial actuation of the switch manipulation part establishes an electrical connection with the pressure-sensitive conductive elastic member, and in response thereto the control circuit supplies power to the control unit, and the further actuation of the switch manipulation part varies the resistance of the pressure-sensitive conductive elastic member, and in response thereto, the control unit variably controls the electric component.

13. The tool according to claim 1, wherein the switch manipulation part has a total stroke movement amount defined by a pin of the switch manipulation part which extends into an elongated hole of a support part.

14. The tool according to claim 13, wherein the total stroke movement amount is 3 mm or less and larger than 0 mm, and a size of the at least one gap is less than the total stroke movement amount of the switch manipulation part.

15. A tool comprising:
a switch that is configured to cause an electric component to operate;
a handle;
a control unit that is configured to control the electric component; and
a control circuit that is configured to cause an electric current to flow to the control unit from a power supply unit,
wherein the switch includes:
a switch manipulation part to be manipulated, the switch manipulation part being located on the handle and including a pressing part;
a support part which includes an opening;
wherein a pin extending from the switch manipulation part extends into the opening of the support part, and the pin moves along the opening as the switch manipulation part moved, and wherein the pin and the opening define a total stroke movement amount of the switch manipulation part;
a load sensor that is configured to receive a pressing force through the switch manipulation part, wherein the switch manipulation part is configured to apply the pressing force against the load sensor by the pressing part of the switch manipulation part pressing on a load sensor pressing part location, wherein the load sensor includes a pressure-sensitive conductive elastic member in which conductive particles are dispersed in a non-conductive elastic material, and a substrate spaced from the pressure-sensitive conductive elastic member when the switch manipulation part is not actuated, wherein the load sensor has a resistance value which varies according to a deformation amount of the pressure-sensitive conductive elastic member when the pressure-sensitive conductive elastic member is pressed d deformed, wherein during an initial actuation of the switch manipulation part contact is established between the pressure-sensitive conductive elastic member and the substrate, wherein movement of the switch manipulation part during the initial actuation is less than the total stroke movement amount of the switch manipulation part, and wherein further actuation of the switch manipulation part after the initial actuation increases a load on the load sensor and on the pressure-sensitive conductive elastic member of the load sensor;

wherein the control circuit includes:

a first switch circuit that is configured not to cause an electric current to flow from the power supply unit to the control unit in a state where the load sensor is not receiving the pressing force though the switch manipulation part, and to cause an electric current to flow front the power supply unit to the control unit once the resistance value of the load sensor is reduced from an initial value by a predetermined amount when the pressure-sensitive conductive elastic member is pressed in the initial actuation of the switch manipulation part; and a resistance value detection circuit that is configured to detect the resistance value of the load sensor which varies by the further actuation of the switch manipulation part after the initial actuation, and wherein the control unit is configured to, after power is supplied from the power supply unit, variably control the electric component according to the resistance value of the load sensor detected by the resistance value detection circuit.

16. A tool comprising:

a switch that is configured to cause an electric component to operate;

a handle that is configured to be gripped by a hand which operates the switch;

a control unit that is configured to control the electric component; and a control circuit that is configured to cause an electric current to flow to the control unit from a power supply unit, wherein the switch includes:

a switch manipulation part to be manipulated, the switch manipulation part being located on the handle;

a load sensor that is configured to receive a pressing force through the switch manipulation part, wherein the load sensor includes a pressure-sensitive conductive elastic member in which conductive particles are dispersed in a non-conductive elastic material, and wherein the load sensor has a resistance value which varies according to a deformation amount of the pressure-sensitive conductive elastic member when the pressure-sensitive conductive elastic member is pressed and deformed, wherein the control circuit includes:

a first switch circuit that is configured not to cause an electric current to flow from the power supply unit to the control unit when the load sensor is in a non-conductive state, and to cause an electric current to flow from the power supply unit to the control unit once the resistance value of the load sensor is reduced from an initial value by a predetermined amount when the pressure-sensitive conductive elastic member is pressed by the switch manipulation part; and a resistance value detection circuit that is configured to detect the resistance value of the load sensor which varies according to the deformation amount of the pressure-sensitive conductive elastic member when the pressure-sensitive conductive elastic member is pressed by the switch manipulation part, and wherein the control unit is configured to, after power is supplied from the power supply unit, variably control the electric component according to the resistance value of the load sensor detected by the resistance value detection circuit.

17. The tool according to claim 16, wherein the control unit starts to operate when an electric current flows from the power supply unit to the control unit by the first switch circuit, wherein the control circuit further includes:

a second switch circuit that is configured to maintain the first switch circuit in an operated state which causes an electric current to flow from the power supply unit to the control unit based on a power supply maintenance signal output from the control unit.

* * * * *